United States Patent
Höglund et al.

(10) Patent No.: US 10,966,238 B2
(45) Date of Patent: Mar. 30, 2021

(54) WIRELESS DEVICE, NETWORK NODE, AND METHODS PERFORMED THEREBY FOR HANDLING GRANT USE

(71) Applicant: Telefonaktiebolaget LM Ericsson (publ), Stockholm (SE)

(72) Inventors: Andreas Höglund, Solna (SE); Olof Liberg, Stockholm (SE); Tuomas Tirronen, Helsinki (FI); Emre Yavuz, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 228 days.

(21) Appl. No.: 16/069,568

(22) PCT Filed: May 9, 2018

(86) PCT No.: PCT/SE2018/050482
§ 371 (c)(1),
(2) Date: Jul. 12, 2018

(87) PCT Pub. No.: WO2018/212699
PCT Pub. Date: Nov. 22, 2018

(65) Prior Publication Data
US 2020/0187242 A1    Jun. 11, 2020

Related U.S. Application Data

(60) Provisional application No. 62/506,745, filed on May 16, 2017.

(51) Int. Cl.
*H04W 72/14*    (2009.01)
*H04W 52/36*    (2009.01)
(Continued)

(52) U.S. Cl.
CPC ......... *H04W 72/14* (2013.01); *H04W 52/365* (2013.01); *H04W 72/1268* (2013.01);
(Continued)

(58) Field of Classification Search
CPC ... H04L 29/02; H04L 29/08; H04L 29/06183; H04L 29/0619; H04L 65/10;
(Continued)

(56) References Cited

U.S. PATENT DOCUMENTS 7,386,615 B1 * 6/2008 Surlaker ............... G06F 9/5011
                                                                       709/222
9,332,132 B1 * 5/2016 Milhizer .............. H04L 43/0876
(Continued)

FOREIGN PATENT DOCUMENTS

WO    WO-2009078652 A2 * 6/2009 ............ H04W 76/30

OTHER PUBLICATIONS

Unknown, Author , "Baseline Solution for Small Data Transmission in RRC_INACTIVE", 3GPP TSG-RAN WG2 #96, Tdoc R2-168713, Ericsson, Reno, Nevada, USA, Nov. 14-18, 2016, 7 pages.
(Continued)

*Primary Examiner* — Warner Wong
(74) *Attorney, Agent, or Firm* — Murphy, Bilak & Homiller, PLLC

(57) ABSTRACT

A method performed by a wireless device (230) is described herein. The method is for handling grant use. The wireless device (230) operates in a wireless communication network (200). The wireless device (230) receives (401), from a network node (210) operating in the wireless communication network (200), a first message granting the wireless device (230) at least two uplink transmissions. The wireless device (230) indicates (402), to the network node (210), on time-frequency resources indicated in a first granted uplink transmission of the at least two uplink transmissions,
(Continued)

Msg3' indication whether or not a second granted uplink transmission of the at least two uplink transmissions is to be used by the wireless device (230).

20 Claims, 21 Drawing Sheets

(51) Int. Cl.
*H04W 72/12* (2009.01)
*H04W 74/08* (2009.01)
H04L 29/06 (2006.01)
H04W 28/12 (2009.01)

(52) U.S. Cl.
CPC ... *H04W 74/0833* (2013.01); *H04L 29/06183* (2013.01); *H04L 65/10* (2013.01); *H04W 28/12* (2013.01)

(58) Field of Classification Search
CPC ..... H04L 65/1003; H04L 47/10; H04L 41/26; H04W 28/00; H04W 28/02; H04W 28/10; H04W 28/12; H04W 52/365; H04W 72/0406; H04W 72/1268; H04W 72/1294; H04W 72/14; H04W 74/00; H04W 74/002; H04W 74/008; H04W 74/08; H04W 74/0833
See application file for complete search history.

(56) References Cited

U.S. PATENT DOCUMENTS

| | | | | |
|---|---|---|---|---|
| 2010/0238829 | A1* | 9/2010 | Sambhwani | H04L 5/001 370/252 |
| 2013/0336160 | A1* | 12/2013 | Yin | H04L 5/0055 370/254 |
| 2017/0374686 | A1* | 12/2017 | Agarwal | H04W 72/14 |
| 2018/0027554 | A1* | 1/2018 | Yerramalli | H04L 1/18 370/329 |
| 2018/0302895 | A1* | 10/2018 | Akkarakaran | H04L 5/0094 |
| 2019/0045538 | A1* | 2/2019 | Sugaya | H04L 69/22 |
| 2020/0036501 | A1* | 1/2020 | Gao | H04L 1/0013 |

OTHER PUBLICATIONS

Unknown, Author , "MAC Aspects on DVI/BSR/PHR/etc for NB-IoT", 3GPP TSG-RAN WG2 #93bis, Tdoc R2-162772, Ericsson, Dubrovnik, Croatia, Apr. 11-15, 2016, 5 pages.

Unknown, Author , "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.2.0, Mar. 2017, 330 pages.

Unknown, Author , "3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.2.0, Mar. 2017, 106 pages.

Unknown, Author , "3rd Generation Partnership Project; Technical Specification Group Radio Access Network; Evolved Universal Terrestrial Radio Access (E-UTRA); Physical layer procedures (Release 14)", 3GPP TS 36.213 V14.1.0, Dec. 2016, 414 pages.

Unknown, Author , "3rd Generation Partnership Project; Technical Specification Group Radio Access Network; Evolved Universal Terrestrial Radio Access (E-UTRA); Physical layer procedures (Release 14)3r", 3GPP TS 36.213 V14.2.0, Mar. 2017, 454 pages.

Unknown, Author , "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.0, Mar. 2017, 721 pages.

* cited by examiner

WIRELESS DEVICE, NETWORK NODE, AND METHODS PERFORMED THEREBY FOR HANDLING GRANT USE

TECHNICAL FIELD

The present disclosure relates generally to a wireless device and methods performed thereby for handling grant use. The present disclosure also relates generally to a network node, and methods performed thereby for handling grant use. The wireless device and the network node operate in a wireless communications network. The present disclosure further relates generally to a computer program product, comprising instructions to carry out the actions described herein, as performed by the wireless device, or the network node. The computer program product may be stored on a computer-readable storage medium.

BACKGROUND

Communication devices within a wireless communication network may be wireless devices, e.g., stations (STAs), User Equipments (UEs), mobile terminals, wireless terminals, terminals, and/or Mobile Stations (MS). Wireless devices are enabled to communicate wirelessly in a cellular communications network or wireless communication network, which may be a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communication network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

In other examples, communication devices may be network nodes. A network node refers to any type of network node serving a User Equipment (UE) and/or connected to another network node or network element or any radio node from where a UE receives a signal. Examples of network node may be: Access Point (AP), transmission point, transmission node, Node B, Base Station (BS), Multi-Standard Radio (MSR) radio node such as MSR BS, eNode B, network controller, Radio Network Controller (RNC), base station controller, relay, donor node controlling relay, Base Transceiver Station (BTS), Remote Radio Unit (RRU), Remote Radio Head (RRH), nodes in Distributed Antenna System (DAS) etc. The wireless communication network covers a geographical area which may be divided into cell areas, each cell area being served by network node such as a Base Station (BS), e.g., a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell may be understood as the geographical area where radio coverage is provided by the base station at a base station site. One base station, situated on the base station site, may serve one or several cells. Further, each base station may support one or several communication technologies. The wireless communication network may also be considered a non-cellular system, comprising network nodes which may serve receiving nodes, such as wireless devices, with serving beams.

There has been a lot of work in the $3^{rd}$ Generation Partnership Project (3GPP) lately on specifying technologies to cover Machine-to-Machine (M2M) and/or Internet of Things (IoT) related use cases. Most recent work for 3GPP Release 13 and 14 includes enhancements to support Machine-Type Communications (MTC) with a new UE categories, Category M1 (Cat-M1), Category M2) (Cat-M2), supporting reduced bandwidth of up to 6 and 24 Physical Resource Blocks (PRBs), and Narrowband IoT (NB-IoT) UEs providing a new radio interface, and UE categories, Cat-NB1 and Cat-NB2.

The Long-Term Evolution (LTE) enhancements introduced in 3GPP Release 13, 14 and 15 for MTC will be referred to herein as enhanced Machine-Type Communications ("eMTC"), including (not limiting) support for bandwidth limited UEs, Cat-M1, and support for coverage enhancements. This is to separate the discussion from the NB-IoT notation, here used for any Release, although the supported features may be considered similar on a general level.

There are multiple differences between "legacy" LTE and the procedures and channels defined for eMTC, likewise for NB-IoT. Some important differences include new physical channels, such as the physical downlink control channels, called MTC Physical Downlink Control Channel (MPDCCH) in eMTC and NB-IoT Physical Downlink Control Channel (NPDCCH) in NB-IoT, and a new physical random access channel, NB-IoT Physical Random Access Channel (NPRACH), for NB-IoT.

For 3GPP Release 15 new Work Items (WIs) "Even further enhanced MTC for LTE (LTE_efeMTC)", referred to herein as "WI_eMTC", and "Further NB-IoT enhancements (NB_IOTfenh)" referred to herein as "WI_NBIOT", target eMTC and NB-IoT enhancements, respectively. In both of these WIs, one goal is to reduce UE power consumption and latency through introducing a possibility to send data as early as possible during the Random Access procedure.

In WI_eMTC, it was set as a goal to support early data transmission [RAN2 lead, RAN1, RAN3]. Particularly, the goal was to evaluate power consumption and/or latency gain, and to specify necessary support for Downlink (DL)/Uplink (UL) data transmission on a dedicated resource during the Random Access procedure, after Physical Random Access Channel (PRACH) transmission and before the Radio Resource Control protocol (RRC) connection setup is completed, at least in the RRC Suspend/Resume case.

In WI_NBIOT, it was set as a goal to evaluate power consumption/latency gain and to specify necessary support for DL/UL data transmission on a dedicated resource during the Random Access procedure after NPRACH transmission and before the RRC connection setup is completed. [RAN2, RAN1, RAN3].

As used herein, such a feature, where data may be sent during the Random Access procedure, may be referred to as an "early data" feature, meaning that data may be sent earlier when compared to current LTE specifications, that is, after RRC connection setup or resume has been completed.

The currently specified random access and connection control procedures may be found in [1] and [2].

From [3], a schematic diagram of the contention based Random Access (RA) procedure is depicted in FIG. 1. As may be appreciated in FIG. 1, first, the UE may selects one of the available RACH preambles and sends to the eNB in a first message, which is indicated in the Figure by the number 1. The UE also provides a temporary identifier to the eNB in this step. Next, the eNB responds to the UE by sending a Random Access Response (RAR) to the UE based on the identifier provided. The RAR is provided in a second message, which is indicated in the Figure by the number 2. In the second message, the eNB also provides the UE with a new temporary identity for any further communication, the Temporary cell radio network temporary identity (C-RNTI). In addition, the eNB provides the UE with a Timing Advance Value to enable the UE to compensate for the round trip delay due to the distance between the UE and the eNB, and provides the UE with an UL grant resource. The structure of the grant included in the Medium Access Control (MAC) RAR is defined in 4. In a third message, which is indicated in the Figure by the number 3, the UE sends an RRC connection request message to eNB, using the grant received in the second message, and the temporary C-RNTI. The second message further comprises a new identifier for the UE, the Temporary Mobile Subscriber Identity (TMSI) or a Random Value, the TMSI if the UE was previously connected to the network, and the Random value is used if UE is connecting for the very first time. Finally, in a fourth message, which is indicated in the Figure by the number 4, the eNB sends a contention resolution message to the UE whose message was successfully received in 3. The fourth message is addressed to the TMSI value or Random number, from 3, comprises yet another identifier, the C-RNTI, to be used for subsequent communication with the UE. The messages in the FIG. 1 are commonly referred to as message 1 (Msg1) through message 4 (Msg 4).

During the Random Access (RA) procedure, there may be a collision between different UEs. This is because two different UEs may have selected and sent the same preamble simultaneously. These two different UEs may then receive the same Temp C-RNTI and UL grant in Msg 2. Interference may lead to the eNB only receiving the Msg3 from one UE or none of the UEs. The contention will be resolved when one of them receives the Msg4 in the last step, as the UE not receiving Msg4 may back-off after a certain time expires. The successful UE may then proceed with the connection setup and decode an RRC connection setup message.

The structure of MAC layer Protocol Data Units (PDUs) are defined in [1] and also referenced to herein.

In existing methods, it is not possible to send uplink or downlink data before the contention based random access procedure has been completed. That is, not before message 4 has been transmitted by the eNB and successfully received by the UE. Data transmission in existing methods therefore involves a certain delay and waste of energy resources.

SUMMARY

It is an object of embodiments herein to improve the handling of communications by a wireless device in a wireless communications network. It is a particular object of embodiments herein to improve the handling of grant usage in a wireless communications network.

According to a first aspect of embodiments herein, the object is achieved by a method, performed by a wireless device. The method is for handling grant use. The wireless device operates in a wireless communication network. The wireless device receives, from a network node operating in the wireless communication network, a first message granting the wireless device at least two uplink transmissions. The wireless device then indicates, to the network node, on time-frequency resources indicated in a first granted uplink transmission of the at least two uplink transmissions, whether or not a second granted uplink transmission of the at least two uplink transmissions is to be used by the wireless device.

According to a second aspect of embodiments herein, the object is achieved by a method, performed by a network node. The method is for handling grant use. The network node operates in the wireless communication network. The network node sends, to the wireless device operating in the wireless communication network, the first message granting the wireless device the at least two uplink transmissions. The network node then obtains, from the wireless device, on the time-frequency resources indicated in the first granted uplink transmission of the at least two uplink transmissions, the indication indicating whether or not the second granted uplink transmission of the at least two uplink transmissions is to be used by the wireless device.

According to a third aspect of embodiments herein, the object is achieved by a wireless device. The wireless device is configured to handle grant use. The wireless device is configured to operate in the wireless communication network. The wireless device is further configured to receive, from the network node configured to operate in the wireless communication network, the first message configured to grant the wireless device the at least two uplink transmissions. The wireless device is also configured to indicate, to the network node, on the time-frequency resources configured to be indicated in the first granted uplink transmission of the at least two uplink transmissions, whether or not the second granted uplink transmission of the at least two uplink transmissions is to be used by the wireless device.

According to a fourth aspect of embodiments herein, the object is achieved by the network node configured to handle grant use. The network node is configured to operate in the wireless communications network. The network node is further configured to send, to the wireless device configured to operate in the wireless communication network, the first message configured to grant the wireless device the at least two uplink transmissions. The network node is further configured to obtain, from the wireless device, on the time-frequency resources configured to be indicated in the first granted uplink transmission of the at least two uplink transmissions, the indication indicating whether or not the second granted uplink transmission of the at least two uplink transmissions is to be used by the wireless device.

According to a fifth aspect of embodiments herein, the object is achieved by a computer program, comprising instructions which, when executed on at least one processor, cause the at least one processor to carry out the method performed by the wireless device.

According to a sixth aspect of embodiments herein, the object is achieved by a computer-readable storage medium, having stored thereon the computer program, comprising instructions which, when executed on at least one processor, cause the at least one processor to carry out the method performed by the wireless device.

According to a seventh aspect of embodiments herein, the object is achieved by a computer program, comprising instructions which, when executed on at least one processor, cause the at least one processor to carry out the method performed by the first network node.

According to an eighth aspect of embodiments herein, the object is achieved by a computer-readable storage medium, having stored thereon the computer program, comprising instructions which, when executed on at least one processor, cause the at least one processor to carry out the method performed by the first network node.

By the wireless device receiving the first message from the network node granting the at least two uplink transmissions, and then indicating to the network node whether or not the second granted uplink transmission is to be used, the wireless device enables the network node to only attempt to decode the second granted uplink transmission, if the wireless device indicates that it is to use it, and refrain from attempting to decode it, if the wireless device indicates it is not to use it. Moreover, if the wireless device indicates that it is not to use the second granted uplink transmission, the network node is enabled to reuse the resources corresponding to the second granted uplink transmission, unused by the wireless device. Therefore, the processing resources in the network node are reduced, the capacity of the wireless communication network is increased, the latency is reduced and energy resources are saved both in the network node, and in the wireless device, all while enabling early data transmission.

BRIEF DESCRIPTION OF THE DRAWINGS

Examples of embodiments herein are described in more detail with reference to the accompanying drawings, according to the following description.

DETAILED DESCRIPTION

Figure 1:
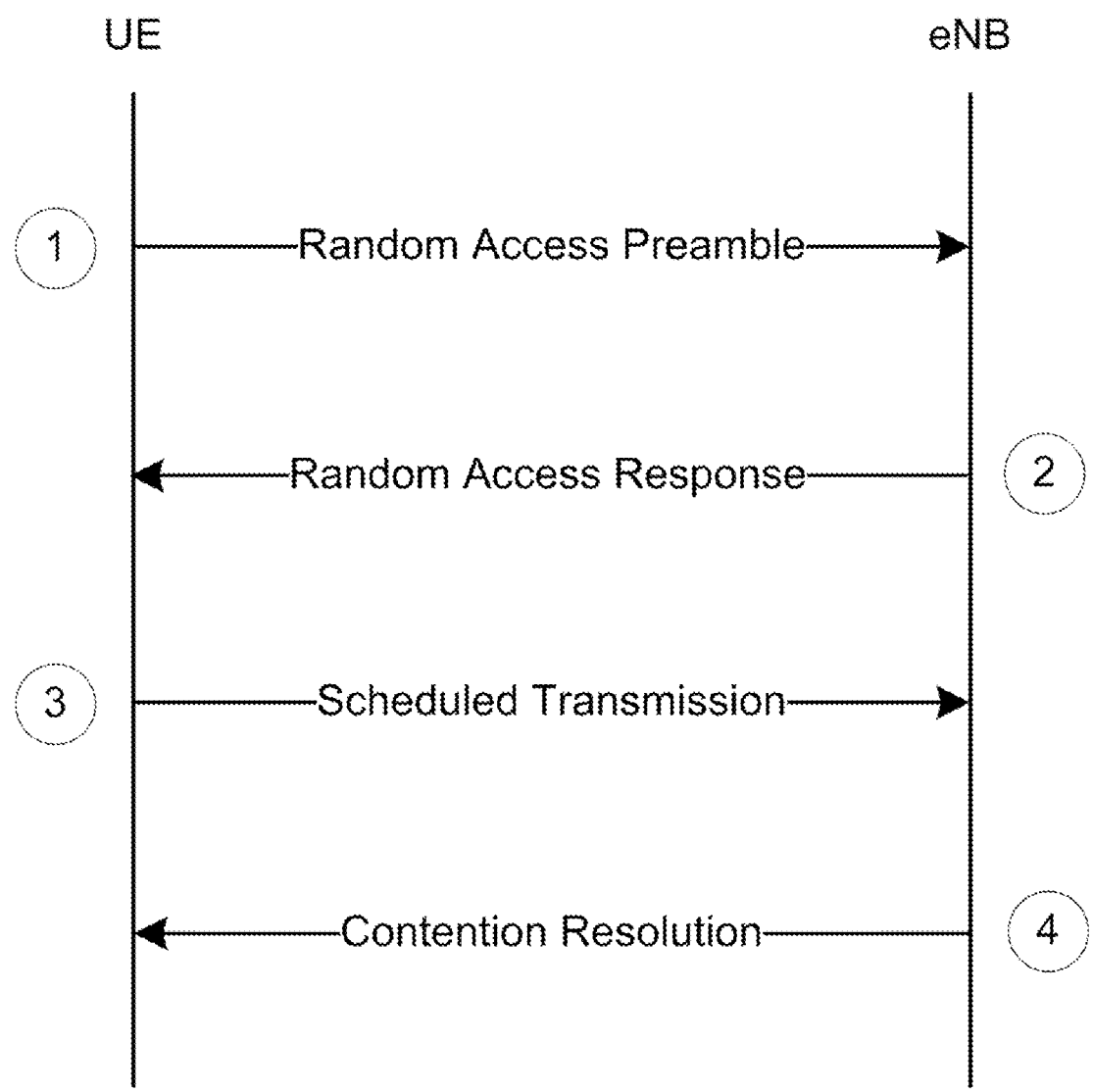
FIG. 1 is a schematic diagram illustrating a Random Access (RA) procedure.

As part of developing embodiments herein, one or more problems that may be associated with use of at least some of the prior art methods, and that may addressed by embodiments herein, will first be identified and discussed.

As stated earlier currently, in LTE, it is not possible to send uplink or downlink data before the contention based random access procedure has been completed, that is, not before message 4 has been transmitted by the eNB and successfully received by the UE.

As the random access procedure is the method for the UE to get dedicated network resources and make its identity known to the eNB, the eNB does in general not know in advance the UE identity until after a potential contention has been resolved, as described earlier. Also, the eNB does not know the capabilities of the UE. Thus, a potential method for sending early data may not rely on the eNB knowing which type of UEs have initiated the random access procedure, and if they support early data transmission or not, if such a feature were to be enabled. Furthermore, UEs not supporting this feature, e.g. Release 13 and 14 UEs, are not able to comprehend any new formats, and therefore, the messages and Random Access procedure may only be changed in a backwards compatible manner.

A first approach to this problem proposes a backwards-compatible method where the network, that is, the eNB, may schedule uplink data already in Msg 3. That is, the eNB may give a grant with larger data allocation compared to legacy specifications. This may be implemented by sending a dual grant in Msg 2, that is, the MAC Random Access Response message, or an extended alternative of Msg2, so that both legacy, i.e., pre-Rel15, UEs not supporting early data and Rel-15 UEs supporting the early data feature may be scheduled. The newly introduced second UL grant is only interpreted by a UE capable of early data, and such UE may autonomously select which of the two UL grants to use for the transmission of Msg3, e.g. based on the size of its UL buffer. The use of a dual UL grant may, by use of a trigger or a flag, be indicated to UEs supporting the early data feature. UEs not supporting this feature, such as e.g., Release 13 and 14 UEs, may not be affected, and they may see a message according to the legacy specifications. This approach is further described in detail below, in the section entitled "Transmission of early data in message 3 (Msg3) via a dual grant".

This first approach, however, may lead to increased eNB processing and/or blind decoding effort, and increased radio resource consumption. Furthermore, UEs not supporting this early data feature, e.g. Release 13 and 14, UEs, are not able to comprehend any new formats specified after Release 14, and therefore, the messages and Random Access procedure may only be changed in a backwards compatible manner.

Embodiments herein may be understood to provide an extension and/or alteration to the dual grant operation for early data in this first approach, described in the in the section entitled "Transmission of early data in message 3 (Msg3) via a dual grant". Instead a UE which is capable of early data transmission selecting one out of the two provided grants, according to embodiments herein, a UE may instead transmit in the uplink resources pointed out by both of them. In the resources provided by the first grant, the UE may indicate whether the second grant will also be used. Particular embodiments herein may be understood to relate to early data and indication of second grant use in Msg3, as will be described in further detail next.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment, and it will be obvious to a person skilled in the art how those components may be used in the other exemplary embodiments.

Note that although terminology from 3GPP LTE has been used in this disclosure to exemplify the embodiments herein, this should not be seen as limiting the scope of the embodiments herein to only the aforementioned system. Other wireless systems, including NR, Wideband Code Division Multiple Access (WCDMA), Worldwide Interoperability for Microwave Access (WiMax), Ultra-Mobile Broadband (UMB) and Global System for Mobile communications (GSM), may also benefit from exploiting the ideas covered within this disclosure.

Figure 2:
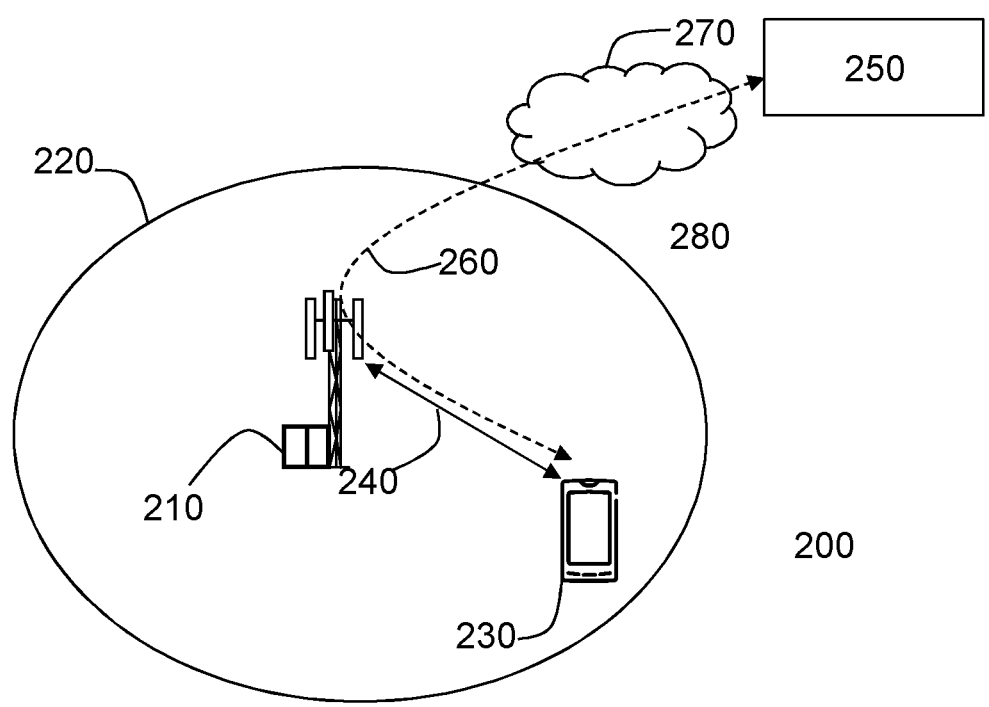
FIG. 2 is a schematic diagram illustrating embodiments of a wireless communication network, according to embodiments herein.
Figure 3:
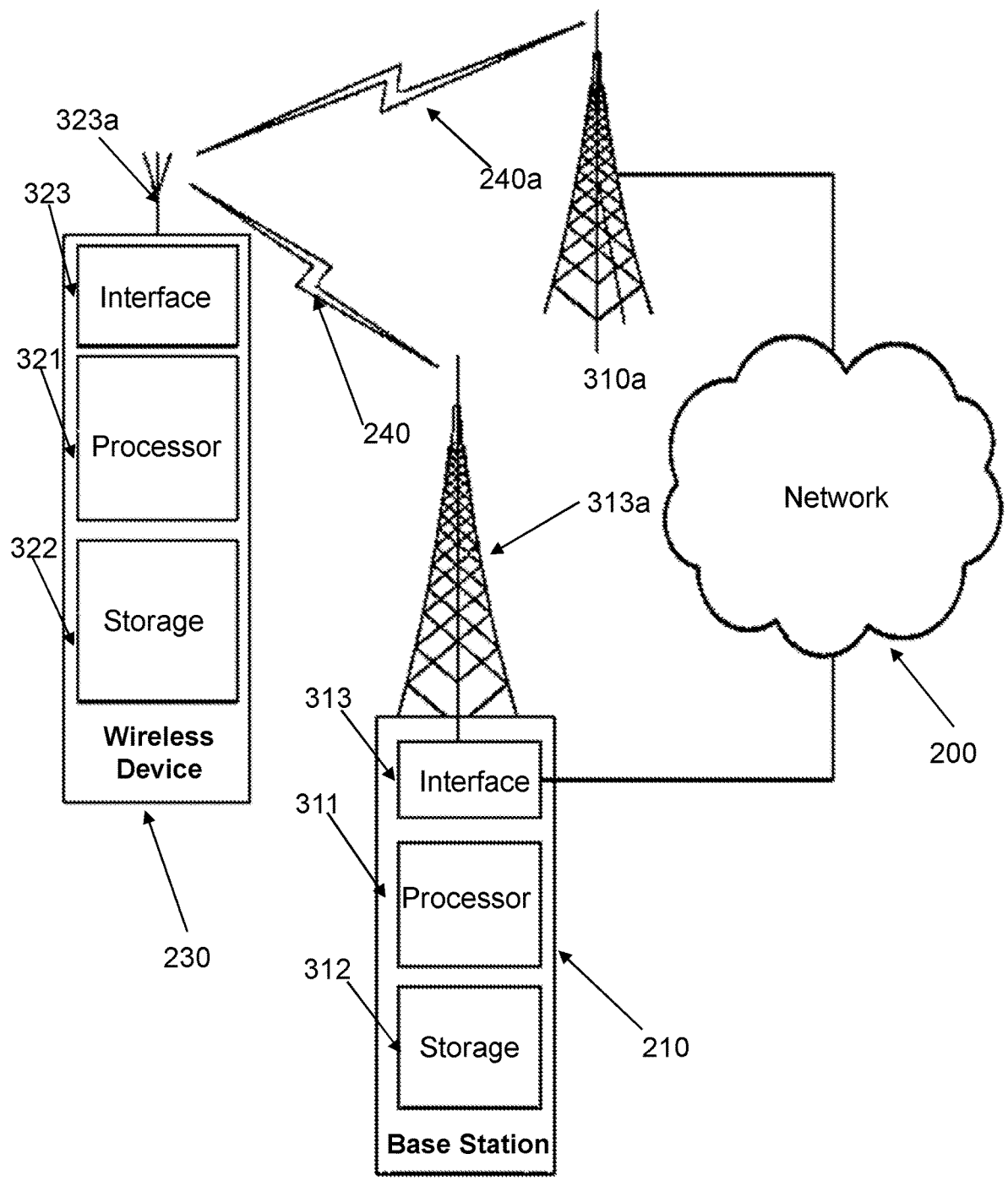
FIG. 3 is a schematic diagram illustrating embodiments of a wireless communication network, according to embodiments herein.

FIG. 2 depicts an example of a wireless communication network 200, in which embodiments herein may be implemented, and which is further described in detail in relation to FIG. 3.

Although the solutions described herein may be implemented in any appropriate type of system using any suitable components, particular embodiments of the described solutions may be implemented in a wireless network, such as the example wireless communication network illustrated in FIG. 2. In the example embodiment of FIG. 2, the wireless communication network 200 provides communication and other types of services to one or more wireless devices. In the illustrated embodiment, the wireless communication network 200 includes one or more instances of network nodes that facilitate the wireless devices' access to and/or use of the services provided by the wireless communication network 200. The wireless communication network 200 may further include any additional elements suitable to support communication between wireless devices or between a wireless device and another communication device, such as a landline telephone. The wireless communications network 200 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network 200 may represent any type of communication, telecommunication, data, cellular, and/or radio network or other type of system. In particular embodiments, the wireless communication network 200 may be configured to operate according to specific standards or other types of predefined rules or procedures. Thus, particular embodiments of the wireless communication network 200 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

The wireless communication network 200 comprises a plurality of network nodes whereof a network node 210 is depicted in FIG. 2. As used herein, "network node" refers to equipment capable, configured, arranged and/or operable to communicate directly or indirectly with a wireless device and/or with other equipment in the wireless communication network 200, that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide, or, stated differently, their transmit power level, and may then also be referred to as femto base stations, pico base stations, micro base stations, or macro base stations. "Network node" may also include one or more, or all, parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). As a particular non-limiting example, a base station may be a relay node or a relay donor node controlling a relay.

Yet further examples of network nodes include multi-standard radio (MSR) radio equipment, such as MSR BSs, network controllers, such as radio network controllers (RNCs), or base station controllers (BSCs), base transceiver stations (BTSs), transmission points, transmission nodes, Multi-cell/multicast Coordination Entities (MCEs), core network nodes, e.g., Mobile Switching Centres (MSCs), Mobility Management Entities (MMEs), Operation and maintenance (O&M) nodes, Operation Support System (OSS) nodes, Self-Organizing Network (SON) nodes, positioning nodes, e.g., Evolved Serving Mobile Location Centers (E-SMLCs), and/or Minimization of Drive Tests (MDTs). More generally, however, network nodes may represent any suitable device, or group of devices, capable, configured, arranged, and/or operable to enable and/or provide a wireless device access to the wireless communication network 200, or to provide some service to a wireless device that has accessed the wireless communication network 200.

The wireless communication network 200 covers a geographical area which may be divided into cell areas, wherein each cell area may be served by a network node, although, one network node may serve one or several cells. The wireless communication network 200 comprises at least a cell. In the non-limiting example depicted in FIG. 2, the network node 210 serves a cell 220.

The wireless communication network 200 comprises a wireless device 230. As used herein, "wireless device" (WD) refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the $3^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 2, the WD 230 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as the network node 210 and/or other WDs.

As used herein, the term "radio node" is used generically to refer both to wireless devices and network nodes, as each is respectively described above.

The network node 210 may communicate with the wireless device 230 over a first link 240, e.g., a radio link.

In some embodiments, the wireless communication network 200 may be connected to a host computer 250, which is depicted in the example of FIG. 2. The host computer 250 may be embodied in the hardware and/or software of a standalone server, a cloud-implemented server, a distributed server or as processing resources in a server farm. The host computer 250 may be under the ownership or control of a service provider, or may be operated by the service provider or on behalf of the service provider. The host computer 250 may communicate with the wireless device 230 via a second link 260. The second link 260 may comprise one or more wired and wireless links, and extend via, e.g., the cloud 270, and any of network nodes or core network nodes in the wireless communication network 200. In some examples, the fifth link 260 may extend via an optional intermediate network, which is not depicted in FIG. 2 to simplify the Figure. The intermediate network may be one of, or a combination of more than one of, a public, private or hosted network; the intermediate network may be a backbone network or the Internet. A connectivity provided by the fifth link 260 may be referred to as an Over the Top (OTT) connection.

The system comprising the host computer 250, and at least one of the network node 210 and the wireless device 230 may be referred to herein as a communications system 280.

FIG. 3 illustrates a wireless network such as the wireless communication network 200 described in FIG. 2, comprising a more detailed view of the network node 210 and the wireless device (WD) 230, in accordance with a particular embodiment. For simplicity, FIG. 3 only depicts the wireless communication network 200, the network nodes 210 and 210a, and the WD 230. The network node 210 comprises a processor 311, a storage 312, an interface 313, and an antenna 313a. Similarly, the WD 230 comprises a processor 321, a storage 322, an interface 323 and an antenna 323a. These components may work together in order to provide network node and/or wireless device functionality, such as providing wireless connections in a wireless network.

In FIG. 3, the network node 210 comprises the processor 311, the storage 312, the interface 313, and the antenna 313a. These components are depicted as single boxes located within a single larger box. In practice however, a network node may comprise multiple different physical components that make up a single illustrated component, e.g., the interface 313 may comprise terminals for coupling wires for a wired connection and a radio transceiver for a wireless connection. As another example, the network node 210 may be a virtual network node in which multiple different physically separate components interact to provide the functionality of the network node 210, e.g., the processor 311 may comprise three separate processors located in three separate enclosures, where each processor is responsible for a different function for a particular instance of the network node 210. Similarly, the network node 210 may be composed of multiple physically separate components, e.g., a NodeB component and a RNC component, a BTS component and a BSC component, etc., which may each have their own respective processor, storage, and interface components. In certain scenarios in which the network node 210 comprises multiple separate components, e.g., BTS and BSC components, one or more of the separate components may be shared among several network nodes. For example, a single RNC may control multiple NodeB's. In such a scenario, each unique NodeB and BSC pair, may be a separate network node. In some embodiments, the network node 210 may be configured to support multiple radio access technologies (RATs). In such embodiments, some components may be duplicated, e.g., separate storage 312 for the different RATs, and some components may be reused, e.g., the same antenna 313a may be shared by the RATs.

The processor 311 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 210 components, such as the storage 312, the network node 210 functionality. For example, the processor 311 may execute instructions stored in the storage 312. Such functionality may include providing various wireless features discussed herein to a wireless device, such as the WD 230, including any of the features or benefits disclosed herein.

The storage 312 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. The storage 312 may store any suitable instructions, data or information, including software and encoded logic, utilized by the network node 210. The storage 312 may be used to store any calculations made by the processor 311 and/or any data received via the interface 313.

The network node 210 also comprises the interface 313 which may be used in the wired or wireless communication of signalling and/or data between the network node 210, the wireless communication network 200, and/or the WD 230. For example, the interface 313 may perform any formatting, coding, or translating that may be needed to allow the network node 210 to send and receive data from the wireless communication network 200 over a wired connection. The interface 313 may also include a radio transmitter and/or receiver that may be coupled to or a part of the antenna 313a. The radio may receive digital data that is to be sent out to other network nodes or WDs via a wireless connection. The radio may convert the digital data into a radio signal having the appropriate channel and bandwidth parameters. The radio signal may then be transmitted via the antenna 313a to the appropriate recipient, e.g., the WD 230.

The antenna 313a may be any type of antenna capable of transmitting and receiving data and/or signals wirelessly. In some embodiments, the antenna 313a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

The WD 230 comprises the processor 321, the storage 322, the interface 323, and antenna 323a. Like the network node 210, the components of the WD 230 are depicted as single boxes located within a single larger box, however, in practice, a wireless device may comprise multiple different physical components that make up a single illustrated component, e.g., the storage 322 may comprise multiple discrete microchips, each microchip representing a portion of the total storage capacity.

The processor 321 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 230 components, such as the storage 322, the WD 230 functionality. Such functionality may include providing various wireless features discussed herein, including any of the features or benefits disclosed herein.

The storage 322 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. The storage 322 may store any suitable data, instructions, or information, including software and encoded logic, utilized by the WD 230. The storage 322 may be used to store any calculations made by the processor 321 and/or any data received via the interface 323.

The interface 323 may be used in the wireless communication of signalling and/or data between the WD 230 and the network node 210. For example, the interface 323 may perform any formatting, coding, or translating that may be needed to allow the WD 230 to send and receive data from the network node 210 over a wireless connection. The interface 323 may also include a radio transmitter and/or receiver that may be coupled to or a part of the antenna 323a. The radio may receive digital data that is to be sent out to the network node 210 via a wireless connection. The radio may convert the digital data into a radio signal having the appropriate channel and bandwidth parameters. The radio signal may then be transmitted via the antenna 323a to the network node 210.

The antenna 323a may be any type of antenna capable of transmitting and receiving data and/or signals wirelessly. In some embodiments, the antenna 323a may comprise one or more omni-directional, sector or panel antennas operable to transmit/receive radio signals between 2 GHz and 66 GHz. For simplicity, the antenna 323a may be considered a part of the interface 323 to the extent that a wireless signal is being used.

In general, the usage herein of "first", "second", "third", "fourth", and/or "fifth" may be understood to be an arbitrary way to denote different elements, and may be understood to not confer a cumulative or chronological character to the elements they modify.

In the description below, any reference to a/the eNB may be understood to refer to the network node 210. Any reference to a/the UE may be understood to refer to the wireless device 230.

Embodiments of a method performed by the wireless device 230, will now be described with reference to the flowchart depicted in FIG. 4. The method is for handling grant use. The wireless device 230 operates in the wireless communication network 200. The expression operating in the wireless communication network 200, may be understood as e.g., operating in connection with, or via the wireless communication network 200. The wireless device 230 and the network node 210 may be operating in the wireless communication network 200. In a particular example, the wireless communication network 200 may be an LTE network. The wireless communication network 200 may also be referred to herein as the network 200.

In some embodiments all the actions may be performed. In some embodiments, an action may be optional. In FIG. 4, the optional action is indicated with dashed lines. One or more embodiments may be combined, where applicable. It should be noted that the examples herein are not mutually exclusive. Components from one embodiment may be tacitly assumed to be present in another embodiment and it will be obvious to a person skilled in the art how those components may be used in the other exemplary embodiments. All possible combinations are not described to simplify the description. Some actions may be performed in a different order than that shown FIG. 4.

Action 401

In order to enable early transmission of data e.g., during a Random Access (RA) procedure, in this Action 401, the wireless device 230 receives, from the network node 210 operating in the wireless communication network 200, a first message granting the wireless device 230 at least two uplink transmissions. That is, the first wireless device 230 may receive the first message comprising a multiple grant. In some particular embodiments, the at least two uplink transmissions may be two uplink transmissions. That is, the first wireless device 230 may receive the first message comprising a dual grant. Some examples herein will be described in relation to a dual grant, to simplify the description of embodiments herein. However, it may be understood that the examples are equally applicable to other examples wherein the first message grants the wireless device 230 more than two uplink transmissions.

In some particular examples, the wireless device 230 may be a UE and the network node 210 may be an eNB.

Receiving may be understood as e.g., obtaining. The receiving in this Action 401 may be implemented, e.g., via the first link 240.

The first message may be a message 2 (Msg 2) in the RA procedure. In some embodiments, the first message granting the at least two uplink transmissions may comprise an explicit indication within the first message that the at least two uplink transmissions have been granted.

The two granted uplink transmissions may be referred to herein as the two grants, the two uplink grants, or the two provided grants. That at least two uplink transmissions have been granted may also be referred to as e.g., that at least two uplinks have been granted.

In some embodiments, the time-frequency resources for the at least two uplink transmissions may be overlapping. The time-frequency resources may be, for example, a number of Physical Resource blocks (PRBs), subcarriers.

Action 402

In this Action 402, the wireless device 230, indicates, to the network node 210, on time-frequency resources indicated in a first granted uplink transmission of the at least two uplink transmissions, whether or not a second granted uplink transmission of the at least two uplink transmissions is to be used by the wireless device 230. The expression "is to be used" may be understood as e.g., will be used.

The first granted uplink transmission and the at least two uplink transmissions may be Msg3 transmissions. The first granted uplink transmission may be understood as, for example, an (N)PUSCH for NB-IoT, or a Physical Uplink Shared Channel (PUSCH) for eMTC or LTE, and the second granted uplink transmission or any of the other at least two uplink transmissions may be e.g., another (N)PUSCH for NB-IoT, or another PUSCH for eMTC or LTE . The time-frequency resources indicated in the first granted uplink transmission may be understood as a resource allocation, e.g., a number of PRBs, subcarriers, possibly with a certain number of repetitions for coverage enhancement.

In some embodiments, the wireless device 230 may indicate, that is, it may provide an indication, e.g., via the first link 240. The indicating may be provided in one of: a) a MAC control element, b) reserved R-bits in a power headroom report, c) a logical channel identifier in a MAC PDU sent in the UL-SCH, d) one or more bits in an RRC message transmitted as part of a Msg3, e) an encoding format for Msg3, and f) a modulation format for Msg3. Each of these possibilities is described below.

In some examples, the wireless device 230 may provide the indication in this Action in an Msg3 in the RA procedure. According to 3GPP TS 36.321 section 3.1, Msg3 may be described as follows: "Msg3: Message transmitted on UL-SCH containing a C-RNTI MAC CE or CCCH SDU, submitted from upper layer and associated with the UE Contention Resolution Identity, as part of a random access procedure."

There are various alternative embodiments for the indication in Msg3.

In a first embodiment, option a) above, a new MAC control element may be introduced for this indication in Action 402.

However, since as little as 1 bit may be required, it may be more efficient to reuse the existing bits. In agreement with this, in a second embodiment, according to option b) above, for LTE and LTE-M, the reserved R-bits in the power headroom report (PHR), shown later in FIG. 5 may, for example, be used for this purpose. That is, using one of the R-bits, which may be previously always set to '0', setting this bit to '1' may indicate that the wireless device 230 will also use the $2^{nd}$ grant to transmit, e.g., Msg3'.

Similarly, for NB-IoT, the reserved bits in the data volume and power headroom report (DPR) MAC control element may be used in the same way, as indicated later in FIG. 6. The DPR may be always sent in Msg3, as stated in TS 36.321 section 5.4.5a: "The reporting is done using the DPR MAC control element, which is sent in Msg3 together with a CCCH SDU".

In a third embodiment, according to option c) above, the use of second grant may be indicated using a logical channel identifier (LCID) in the MAC PDU, sent in the UpLink Shared Channel UL-SCH. If the wireless device 230 is going to use the second grant, a new LCID, reserved in the specification for this purpose, may be used for the transmission using the first grant. For wireless device 230, or other UEs, whether not able or not wanting to use the second grant, the legacy procedure may be applied, that is, the usual/existing LCID may be used. Thus, this procedure may be understood to be backwards compatible. This may be for example, implemented as follows. Currently, TS 36.321, v14.2.0, section 6.2.1 states the following on the LCID: "LCID: The Logical Channel ID field identifies the logical channel instance of the corresponding MAC SDU or the type of the corresponding MAC control element or padding as described in tables 6.2.1-1, 6.2.1-2 and 6.2.1-4 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. A UE of Category 0 [12] except when in enhanced coverage, and unicastFreqHoppingInd-r13 is indicated in SystemInformationBlockType1-BR, and UE supports frequency hopping for unicast [12] shall indicate CCCH using LCID "01011", a BL UE with support for frequency hopping for unicast [12] and a UE in enhanced coverage with support for frequency hopping for unicast [12] shall if unicastFreqHoppingInd-r13 is indicated in the BR version of SystemInformationBlockType2 indicate CCCH using LCID "01100", otherwise the UE shall indicate CCCH using LCID "00000". The LCID field size is 5 bits."

In the above text, a non-limiting example addition may be: "A BL UE or UE in enhanced coverage or NB-IoT UE with support for dual RAR grant and intention to use the additional grant, shall indicate CCCH using LCID "01101".

An example of definition of the reserved values for LCID may be as depicted in Table 1, which is modified from TS 36.321 v14.2.0, section 6.2.1. The changes in the table are shown in bold font.

TABLE 1

Table 6.2.1-2 Values of LCID for UL-SCH

| Index | LCID values |
| --- | --- |
| 00000 | CCCH |
| 00001-01010 | Identity of the logical channel |
| 01011 | CCCH |
| 01100 | CCCH |
| 01101 | CCCH |
| 01110-10111 | Reserved |
| 10100 | Recommended bit rate query |
| 10101 | SPS confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

For NB-IoT, only the following LCID values for UL-SCH may be applicable: Cyclic Redundancy Check (CCCH), that is, LCID "00000", Identity of the logical channel, C-RNTI, Short Buffer Status Report (BSR) and Padding.

It may be understood that while the above text may use the example of two grants, in one embodiment this may be generalized to any number of grants larger than one. It may be understood that any description provided herein for a dual grant may equally apply to a multiple grant, and vice versa, any description provide herein for a multiple grant may equally apply to the particular case of a dual grant.

In a fourth embodiment, according to option d) above, one or more bits may be reserved in the RRC message that may be transmitted as part of Msg3, for indicating the use of the second grant. Such RRC messages may include e.g., the RRC Connection Request and RRC Connection Resume Request.

In a fifth embodiment, according to option e) above, the indication of use of the second grant may be made by means of using a new encoding format for Msg3 corresponding to the first grant. A non-limiting example may be to XOR a known binary vector over the Cyclic Redundancy Check (CRC) of the encoded Msg3 corresponding to the first grant.

In a sixth embodiment, according to option f) above, the indication of use of the second grant may be made by means of using a new modulation format for Msg3 corresponding to the first grant. A non-limiting example may be to use a negative rotation index for the Msg3 modulation corresponding to the first grant. This may correspond, for example, to transmitting the NB-IoT Narrowband Physical Uplink Shared Channel ((N)PUSCH) Format 2 using $-\pi/2$-Binary Phase Shift Keying (BPSK) and $-\pi/4$-Quadrature Phase Shift Keying (QPSK) modulation.

By the wireless device 230, in this Action 402, indicating to the network node 210 whether or not the second granted uplink transmission is to be used, the network node 210 is enabled to avoid attempting to decode the second granted uplink transmission, should the wireless device 230 indicate that it is not to use it, or efficiently decode it, if the wireless device 230 indicates it will use it. Moreover, should the wireless device 230 indicate that it is not to use the second granted uplink transmission, the network node 210 is advantageously enabled to reuse the resources unused by the wireless device 230. Therefore, the processing resources in the network node 210 are reduced, the capacity of the wireless communication network 200 is increased, the latency is reduced and energy resources are saved both in the network node 210, and in the wireless device 230.

Action 403

In this Action 403, the wireless device 230 may transmit data to the network node 210, using the second granted uplink transmission.

The first message may be the message 2 (Msg 2) and the data may be obtained in the second message, the second message being a message 3 (Msg 3). Particularly, in some embodiments, the first message may be the message 2 (Msg 2), in the RA procedure, and the data may be transmitted in a second message, the second message being a message 3 (Msg 3) in the RA procedure.

By the wireless device 230 transmitting data to the network node 210 using the second granted uplink transmission in this Action 403, early data transmission is enabled while the usage of processing, radio and energy resources in the wireless communication network 200 is optimized.

Embodiments of a method performed by the network node 210, will now be described with reference to the flowchart depicted in FIG. 5. The method is for handling grant use. The network node 210 operates in the wireless communication network 200.

In some embodiments all the actions may be performed. In some embodiments, an action may be optional. In FIG. 5, the optional action is indicated with dashed lines. One or more embodiments may be combined, where applicable. It should be noted that the examples herein are not mutually exclusive. Components from one embodiment may be tacitly assumed to be present in another embodiment and it will be obvious to a person skilled in the art how those components may be used in the other exemplary embodiments. All possible combinations are not described to simplify the description. Some actions may be performed in a different order than that shown FIG. 5.

The detailed description of some of the following corresponds to the same references provided above, in relation to the actions described for the wireless device 230, and will thus not be repeated here to simplify the description. For example, the first message may be the Msg 2 in the RA procedure.

Action 501

In this Action 501, the network node 210 sends, to the wireless device 230 operating in the wireless communication network 200, the first message granting the wireless device 230 the at least two uplink transmissions. That is, the first network node 210 may send the first message comprising the multiple grant. As described earlier, in some examples, the at least two uplink transmissions are two uplink transmissions. That is, the first network node 210 may send the first message comprising the dual grant.

In some embodiments, the time-frequency resources for the at least two uplink transmissions may be overlapping.

The first message granting the at least two uplink transmissions may comprise the explicit indication within the first message that the at least two uplink transmissions have been granted.

Action 502

In this Action 502, the network node 210, obtains, from the wireless device 230, on the time-frequency resources indicated in the first granted uplink transmission of the at least two uplink transmissions, the indication indicating whether or not the second granted uplink transmission of the at least two uplink transmissions is to be used by the wireless device 230.

As described earlier, the indication may be provided in one of: a) the MAC control element, b) the reserved R-bits in the power headroom report, c) the logical channel identifier in the MAC PDU sent in the UL-SCH, d) the one or more bits in the RRC message transmitted as part of the Msg3, e) the encoding format for Msg3, and f) the modulation format for Msg3.

Action 503

In this Action 403, the network node 210 may obtain the data from the wireless device 230, using the second granted uplink transmission.

In some embodiments, the first message may be the message 2 (Msg 2) in the RA procedure, and the data may be obtained in the second message, the second message being the message 3 (Msg 3) in the RA procedure.

Embodiments herein will now be described with some non-limiting examples.

Figure 6:
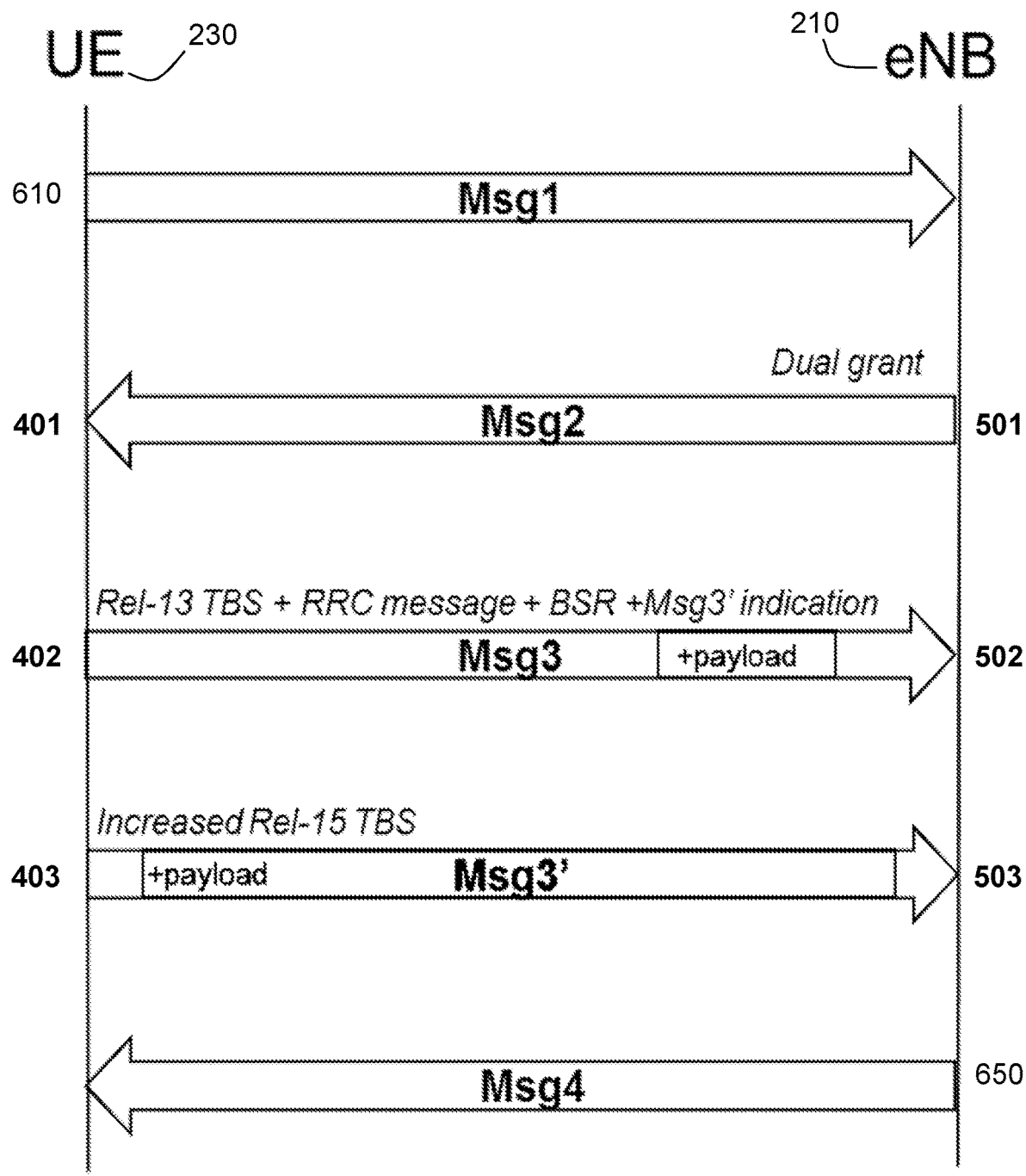
FIG. 6 is a schematic signalling diagram illustrating an indication of Msg3' transmission in Msg3, according to embodiments herein.

FIG. 6 depicts a non-limiting example of a signalling diagram for the indication of the Msg3' transmission in Msg3. At 610, the wireless device 230, a UE in this example, sends a Msg1 to the network node 210, an eNB in this example, the Msg1 comprising a preamble. In accordance with Action 401, the wireless device 230 receives the first message granting the wireless device 230 here, two uplink transmissions, that is, a dual grant, in the Msg2, which the network node 210 has sent at 501. The wireless device 230, in accordance with 402, indicates, to the network node 210, in the first granted uplink transmission, that is, in the Msg3, that the second granted uplink transmission, indicated as Msg3', is to be used by the wireless device 230. The Msg3 comprises a Rel-13 TBS, an RRC message, a BSR and the indication that the second granted uplink transmission, Msg3', is to be used by the wireless device 230. In accordance with Action 403, the wireless device 230 transmits data to the network node 210, using the second uplink transmission, that is, the Msg3', which has an increased Rel-15 TBS. Finally, at 650, the network node 210 responds with a contention resolution message, the Msg 4, to the wireless device 230.

Figure 7:
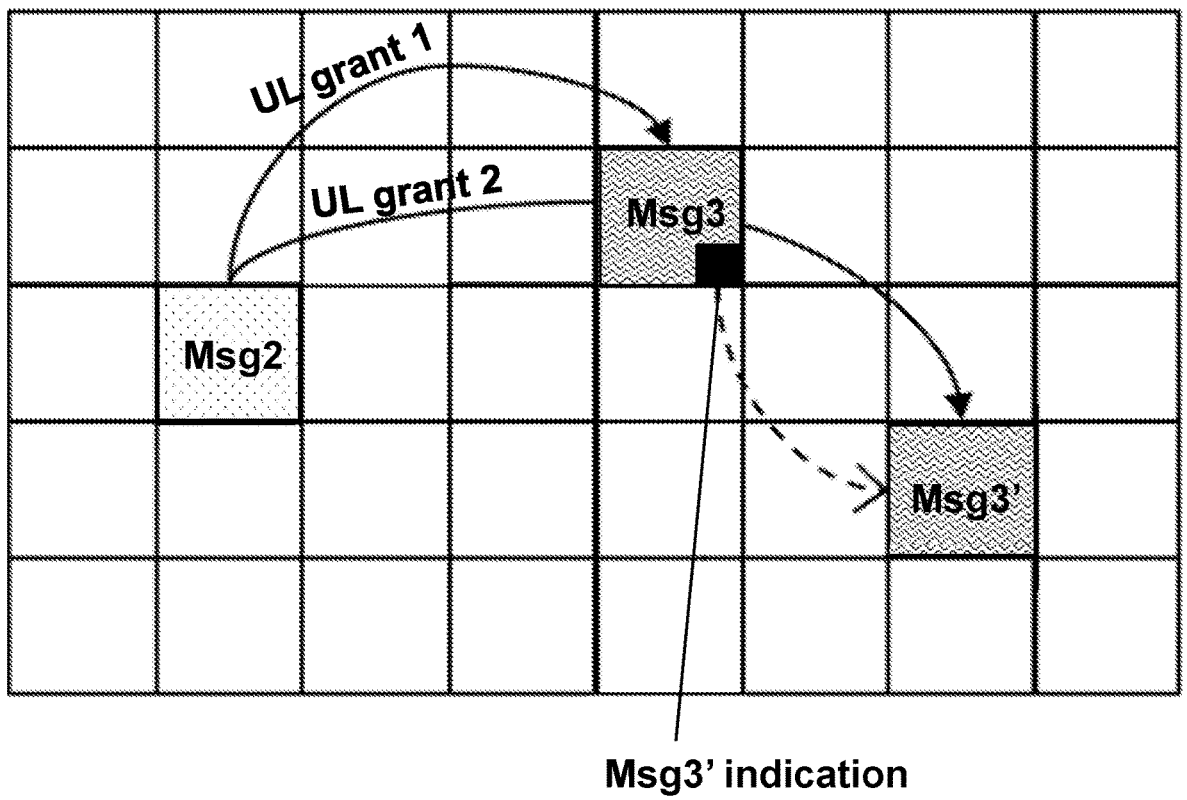
FIG. 7 is a schematic diagram illustrating an (N)PDCCH Msg2 containing two UL (N)PUSCH grants, according to embodiments herein.

FIG. 7 is a schematic diagram depicting a non-limiting example illustration of a (N)PDCCH Msg2 containing two UL (N)PUSCH grants for Msg3 transmission, in which the wireless device 230 may indicate in the first (Msg3) whether the second will be used, e.g., Msg3', in agreement to some examples of Action 402. The indication in the Msg3 that may be used to indicate whether the second Msg3' will be used is represented in FIG. 7 with a solid black box.

Figure 8:
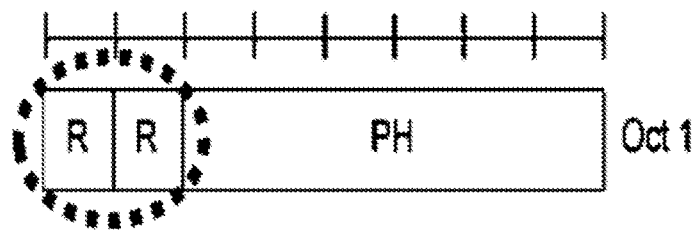
FIG. 8 is a schematic diagram illustrating reserved bits in an LTE power headroom report MAC control element.

FIG. 8 is a schematic diagram depicting the reserved bits, circled, in an LTE power headroom report MAC control element, which may be used by the wireless device 230 to indicate to the network node 210 whether or not a second granted uplink transmission of the at least two uplink transmissions is to be used, in agreement with the description provided in Action 402 for some embodiments herein.

Figure 9:
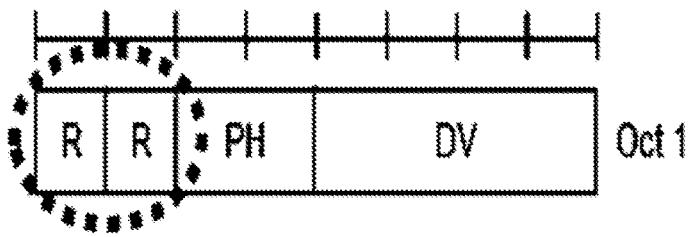
FIG. 9 is a schematic diagram illustrating reserved bits for data volume and power headroom report MAC control element.

FIG. 9 is a schematic diagram depicting the reserved bits, circled, for data volume and power headroom report MAC control element, which may be used by the wireless device 230 to indicate to the network node 210 whether or not a second granted uplink transmission of the at least two uplink transmissions is to be used, in agreement with the description provided in Action 402 for other embodiments herein.

As a summarized view of the description provided herein, embodiments herein may be understood to relate to indicating in the Msg3 corresponding to a first grant, if the wireless device 230, e.g., a UE, will use a second optional Msg3, e.g., Msg3', corresponding to a second grant.

One or more advantages of embodiments herein may be understood to be that they reduce the eNB blind decoding effort, as the eNB is enabled to know if the UE may be planning to used second uplink grant or not, and therefore, if it may need to decode it or not. In addition, if the resources of the second grant are not used, they enable the possibility to free them up for any other use.

In the description on dual grant operation provided in the section entitled "Transmission of early data in message 3 (Msg3) via a dual grant" herein, the UE may select among the two provided grants, one with smaller and Rel-13 compliant Transport Block Size (TBS), and one new and larger TBS. That is, the eNB may provide two UL grants to the UE that may be accessing the system in Msg2. This first grant may be understood to be intended to be used by Release 13 and 14 UEs for continuing the connection set up, while the second grant may be understood to be intended to support connection setup and early data transmission for UEs capable of this new feature. This first approach may be understood to introduce new requirements on the eNB. This is since the eNB may be required to blindly detect which of the two grants the UE may have responded to. Dual grants may also lead to a waste of UL radio resources, as the UE may only use one out of the two granted uplink resource allocations. According to a second approach described in embodiments herein, a UE capable of early data transmission which has a large UL data buffer may make use of both grants, and hence transmit in both of the associated (N)PUSCH resources. The eNB may schedule the smaller UL grant with the Rel-13 compliant TBS first in time, and in it, the UE may indicate whether the second UL grant will be used or not, this is illustrated in FIG. 7 and FIG. 8. The indication may have to be such that UEs not capable of Rel-15 early data transmission, e.g. Rel-13 UEs, may automatically always indicate that they will not use the second grant, with the larger TBS.

Figure 10:
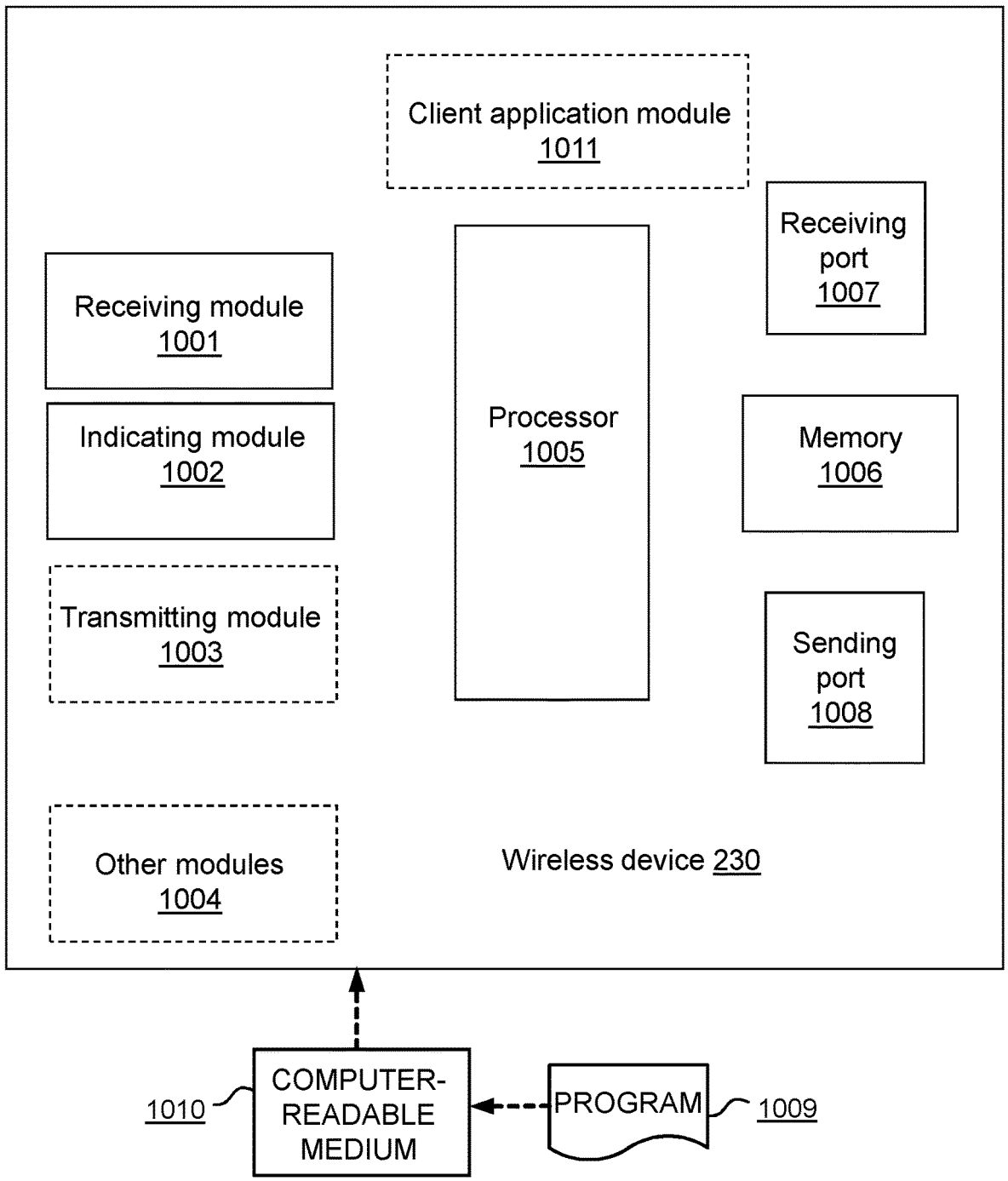
FIG. 10 is a schematic block diagram illustrating embodiments of a wireless device, according to embodiments herein.

To perform the method actions described above in relation to FIG. 4, in a particular example, the wireless device 230 may comprise the following arrangement depicted in FIG. 10. The wireless device 230 is configured to handle grant use. The wireless device 230 is further configured to operate in the wireless communication network 200.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

The detailed description of some of the following corresponds to the same references provided above, in relation to the actions described for the wireless device 230 and will thus not be repeated here. For example, the first message may be the Msg 2 in the RA procedure.

In FIG. 10, optional modules are indicated with dashed boxes.

The wireless device 230 is configured to, e.g. by means of a receiving module 1001 within the wireless device 230 configured to, receive, from the network node 210 configured to operate in the wireless communication network 200, the first message configured to grant the wireless device 230 the at least two uplink transmissions.

In some examples, the at least two uplink transmissions are two uplink transmissions.

In some embodiments, the time-frequency resources for the at least two uplink transmissions may be overlapping.

The wireless device 230 is further configured to, e.g. by means of an indicating module 1002 within the wireless device 230 configured to, indicate, to the network node 210, on time-frequency resources configured to be indicated in the first granted uplink transmission of the at least two uplink transmissions, whether or not the second granted uplink transmission of the at least two uplink transmissions is to be used by the wireless device 230.

In some embodiments, the first message may be the message 2 (Msg 2) in the RA procedure, and the data may be configured to be transmitted in the second message, the second message being the message 3 (Msg 3) in the RA procedure.

The indication may be configured to be provided in one of: a) the MAC control element, b) the reserved R-bits in a power headroom report, c) the logical channel identifier in a MAC PDU sent in UL-SCH, d) the one or more bits in an RRC message configured to be transmitted as part of a Msg3, e) the encoding format for Msg3, and f) the modulation format for Msg3.

The first message configured to grant the at least two uplink transmissions may comprise the explicit indication within the first message that at least two uplink transmissions have been granted.

The wireless device 230 may be further configured to, e.g. by means of a transmitting module 1003 within the wireless device 230 configured to, transmit data to the network node 210, using the second granted uplink transmission.

Other modules 1004 may be comprised in the wireless device 230.

The embodiments herein may be implemented through one or more processors, such as a processor 1005 in the wireless device 230 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the wireless device 230. One such carrier may be in the form of a CD ROM disc. It is however feasible with other data carriers such as a memory stick. The computer program code may furthermore be provided as pure program code on a server and downloaded to the wireless device 230.

The wireless device 230 may further comprise a memory 1006 comprising one or more memory units. The memory 1006 is arranged to be used to store obtained information, store data, configurations, schedulings, and applications etc. to perform the methods herein when being executed in the wireless device 230.

In some embodiments, the wireless device 230 may receive information from the network node 210, the host computer 250, or any network node or device, through a receiving port 1007. In some embodiments, the receiving port 1007 may be, for example, connected to one or more antennas in wireless device 230. In other embodiments, the wireless device 230 may receive information from another structure in the wireless communication network 200 through the receiving port 1007. Since the receiving port 1007 may be in communication with the processor 1005, the receiving port 1007 may then send the received information to the processor 1005. The receiving port 1007 may also be configured to receive other information.

The processor 1005 in the wireless device 230 may be further configured to transmit or send information to e.g., the network node 210, the host computer 250, or any network node or device, through a sending port 1008, which may be in communication with the processor 1005, and the memory 1006.

Those skilled in the art will also appreciate that the receiving module 1001, the indicating module 1002, the transmitting module 1003, the other modules 1004, and the client application module 1011 described above may refer to a combination of analog and digital modules, and/or one or more processors configured with software and/or firmware, e.g., stored in memory, that, when executed by the one or more processors such as the processor 1005, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1001-1004 and 1011 described above may be implemented as one or more applications running on one or more processors such as the processor 1005.

Thus, the methods according to the embodiments described herein for the wireless device 230 may be respectively implemented by means of a computer program 1009 product, comprising instructions, i.e., software code portions, which, when executed on at least one processor 1005, cause the at least one processor 1005 to carry out the actions described herein, as performed by the wireless device 230. The computer program 1009 product may be stored on a computer-readable storage medium 1010. The computer-readable storage medium 1010, having stored thereon the computer program 1009, may comprise instructions which, when executed on at least one processor 1005, cause the at least one processor 1005 to carry out the actions described herein, as performed by the wireless device 230. In some embodiments, the computer-readable storage medium 1010 may be a non-transitory computer-readable storage medium, such as a CD ROM disc, a memory stick, or stored in the cloud space. In other embodiments, the computer program 1009 product may be stored on a carrier containing the computer program, wherein the carrier is one of an electronic signal, optical signal, radio signal, or the computer-readable storage medium 1010, as described above.

In a particular example, the wireless device 230 may comprise: a) the receiving module 1001 configured to receive, from the network node 210, the first message configured to grant the wireless device 230 the at least two uplink transmissions, and b) the indicating module 1002 configured to indicate, to the network node 210, on time-frequency resources configured to be indicated in the first granted uplink transmission of the at least two uplink transmissions, whether or not the second granted uplink transmission of the at least two uplink transmissions is to be used by the wireless device 230.

In a further particular embodiment, the wireless device 230 may further comprise the transmitting module 1003 configured to transmit data to the network node 210, using the second granted uplink transmission.

Figure 11:
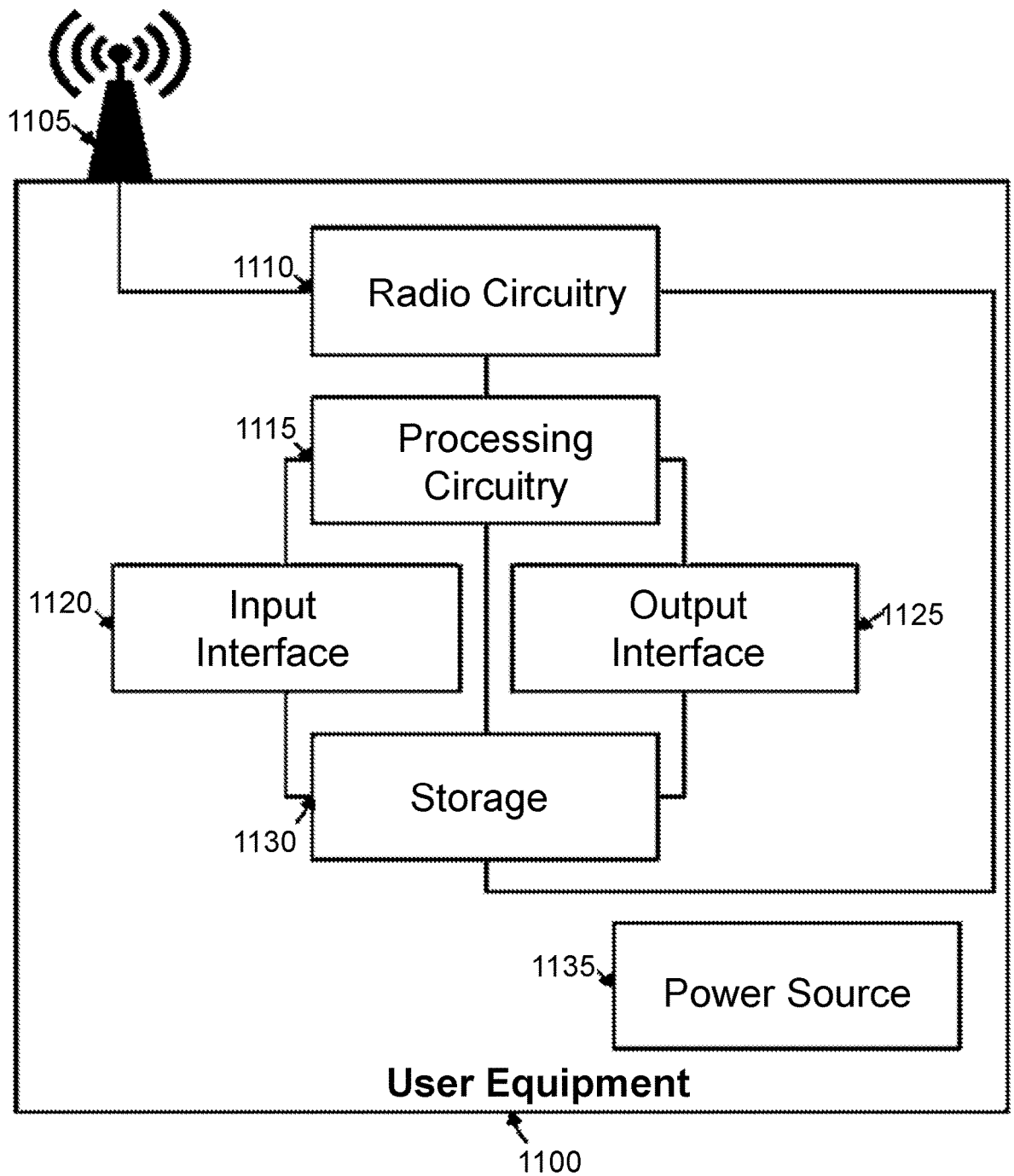
FIG. 11 is a schematic block diagram illustrating embodiments of a user equipment, according to embodiments herein.

Another example of the wireless device 230 has been further described in relation to FIG. 3. The wireless device 230 will now be further described in relation to FIG. 11. As shown in FIG. 11, user equipment (UE) 1100 is an example of the wireless device 230. In this example, the UE 1100 includes an antenna 1105, radio front-end circuitry 1110, processing circuitry 1115, and a computer-readable storage medium 1130. Antenna 1105 may include one or more antennas or antenna arrays, and is configured to send and/or receive wireless signals, and is connected to radio front-end circuitry 1110. In certain alternative embodiments, the wireless device 230 may not include the antenna 1105, and the antenna 1105 may instead be separate from wireless device 230, and be connectable to wireless device 230 through an interface or port.

The radio front-end circuitry 1110 may comprise various filters and amplifiers, may be connected to antenna 1105 and processing circuitry 1115, and may be configured to condition signals communicated between the antenna 1105 and the processing circuitry 1115. In certain alternative embodiments, the wireless device 230 may not include the radio front-end circuitry 1110, and the processing circuitry 1115 may instead be connected the antenna 1105 without the radio front-end circuitry 1110.

The processing circuitry 1115 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. The processing circuitry 1115 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device, such as the wireless device 230, may be provided by the processing circuitry 1115 executing instructions stored on a computer-readable storage medium 1130. In alternative embodiments, some or all of the functionality may be provided by the processing circuitry 1115 without executing instructions stored on a computer-readable medium, such as in a hard-wired manner. In any of those particular embodiments, whether executing instructions stored on a computer-readable storage medium or not, the processing circuitry may be said to be configured to perform the described functionality. The benefits provided by such functionality are not limited to the processing circuitry 1115 alone or to other components of UE 1100, but are enjoyed by the wireless device 230 as a whole, and/or by end users and the wireless network generally.

The antenna 1105, the radio front-end circuitry 1110, and/or the processing circuitry 1115 may be configured to perform any receiving operations described herein as being performed by a wireless device such as the wireless device 230. Any information, data and/or signals may be received from a network node such as the network node 210, and/or another wireless device.

The processing circuitry 1115 may be configured to perform any determining operations described herein as being performed by the wireless device 230. The determining as performed by processing circuitry 1115 may include processing information obtained by the processing circuitry 1115 by, for example, converting the obtained information into other information, comparing the obtained information or converted information to information stored in the wireless device 230, and/or performing one or more operations based on the obtained information or converted information, and as a result of said processing making a determination.

The antenna 1105, the radio front-end circuitry 1110, and/or the processing circuitry 1115 may be configured to perform any transmitting operations described herein as being performed by a wireless device. Any information, data and/or signals may be transmitted to a network node, such as the network node 210, and/or another wireless device.

The computer-readable storage medium 1130 may be generally operable to store instructions, such as a computer program, software, an application including one or more of logic, rules, code, tables, etc. and/or other instructions capable of being executed by a processor. Examples of computer-readable storage medium 1130 include computer memory, for example, Random Access Memory (RAM) or Read Only Memory (ROM), mass storage media, for example, a hard disk, removable storage media, for example, a Compact Disk (CD) or a Digital Video Disk (DVD), and/or any other volatile or non-volatile, non-transitory computer-readable and/or computer-executable memory devices that store information, data, and/or instructions that may be used by processing circuitry 1115. In some embodiments, the processing circuitry 1115 and computer-readable storage medium 1130 may be considered to be integrated.

Alternative embodiments of UE 1100 may include additional components beyond those shown in FIG. 11 that may be responsible for providing certain aspects of the UE's functionality, including any of the functionality described herein and/or any functionality necessary to support the embodiments described herein. As just one example, the UE 1100 may include input interfaces, devices and circuits, and output interfaces, devices and circuits. Input interfaces, devices, and circuits are configured to allow input of information into the UE 1100, and may be connected to processing circuitry 1115 to allow the processing circuitry 1115 to process the input information. For example, input interfaces, devices, and circuits may include a microphone, a proximity or other sensor, keys/buttons, a touch display, one or more cameras, a USB port, or other input elements. Output interfaces, devices, and circuits may be configured to allow output of information from the UE 1100, and may be connected to the processing circuitry 1115 to allow the processing circuitry 1115 to output information from the UE 1100. For example, output interfaces, devices, or circuits may include a speaker, a display, vibrating circuitry, a USB port, a headphone interface, or other output elements. Using one or more input and output interfaces, devices, and circuits, the UE 1100 may communicate with end users and/or the wireless network, and allow them to benefit from the functionality described herein.

As another example, the UE 1100 may include a power source 1135. The power source 1135 may comprise power management circuitry. The power source 1135 may receive power from a power supply, which may either be comprised in, or be external to, the power source 1135. For example, the UE 1100 may comprise a power supply in the form of a battery or battery pack which is connected to, or integrated in, the power source 1135. Other types of power sources, such as photovoltaic devices, may also be used. As a further example, the UE 1100 may be connectable to an external power supply, such as an electricity outlet, via an input circuitry or interface such as an electrical cable, whereby the external power supply may supply power to the power source 1135. The power source 1135 may be connected to the radio front-end circuitry 1110, the processing circuitry 1115, and/or the computer-readable storage medium 1130 and be configured to supply the UE 1100, including the processing circuitry 1115, with power for performing the functionality described herein.

The UE 1100 may also include multiple sets of the processing circuitry 1115, the computer-readable storage medium 1130, the radio circuitry 1110, and/or the antenna 1105 for different wireless technologies integrated into wireless device 230, such as, for example, GSM, WCDMA, LTE, NR, Wi-Fi, or Bluetooth wireless technologies. These wireless technologies may be integrated into the same or different chipsets and other components within wireless device 230.

Figure 12:
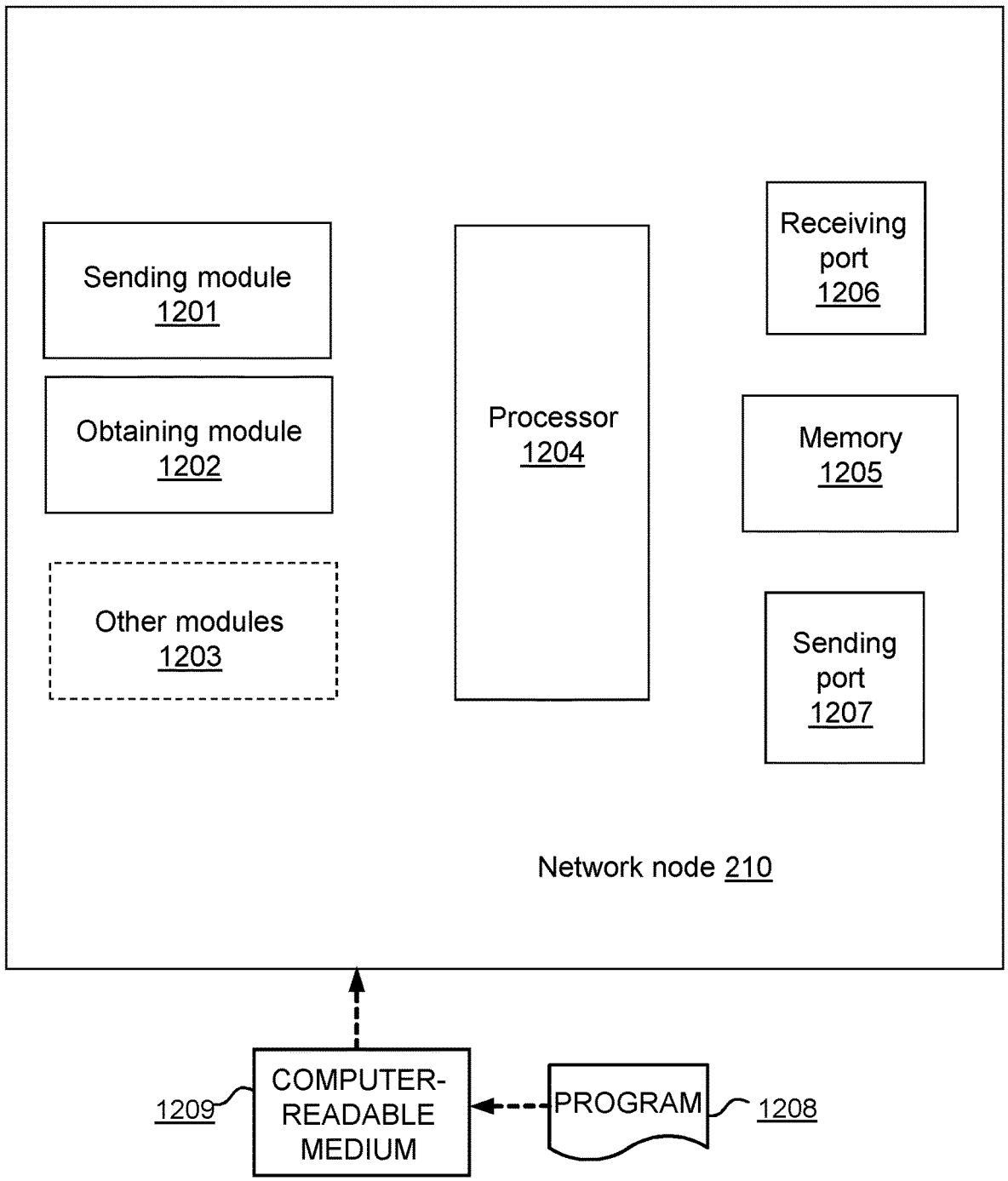
FIG. 12 is a schematic block diagram illustrating embodiments of a network node, according to embodiments herein.

To perform the method actions described above in relation to FIG. 5, in an example, the network node 210 may comprise the following arrangement depicted in FIG. 12. Another example of the network node 210 has been further described in relation to FIG. 3. The network node 210 is configured to handle grant use. The network node 210 is further configured to operate in the wireless communication network 200.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

The detailed description of some of the following corresponds to the same references provided above, in relation to the actions described for the wireless device 230 and will thus not be repeated here. For example, the first message may be the Msg 2 in the RA procedure.

In FIG. 12, optional modules are indicated with dashed boxes.

The network node 210 is configured to, e.g. by means of a sending module 1201 within the network node 210 configured to, send, to the wireless device 230 configured to operate in the wireless communication network 200, the first message configured to grant the wireless device 230 the at least two uplink transmissions.

In some embodiments, the at least two uplink transmissions are two uplink transmissions.

In some embodiments, the time-frequency resources for the at least two uplink transmissions may be overlapping.

The network node 210 is configured to, e.g., by means of an obtaining module 1202 within the network node 210 configured to, obtain, from the wireless device 230, on the time-frequency resources configured to be indicated in the first granted uplink transmission of the at least two uplink transmissions, the indication indicating whether or not the second granted uplink transmission of the at least two uplink transmissions is to be used by the wireless device 230.

In some embodiments, the first message may be the message 2 (Msg 2) in the RA procedure, and the data may be configured to be transmitted in the second message, the second message being the message 3 (Msg 3) in the RA procedure.

The indication may be configured to be obtained in one of: a) the MAC control element, b) the reserved R-bits in a power headroom report, c) the logical channel identifier in a MAC PDU sent in UL-SCH, d) the one or more bits in an RRC message configured to be transmitted as part of a Msg3, e) the encoding format for Msg3, and f) the modulation format for Msg3.

The first message configured to grant the at least two uplink transmissions may comprise the explicit indication within the first message that the at least two uplink transmissions have been granted.

The network node 210 may be configured to, e.g. by means of the obtaining module 1202 within the network node 210 configured to, obtain the data from the wireless device 230, using the second granted uplink transmission.

Other modules 1203 may be comprised in the network node 210.

The embodiments herein may be implemented through one or more processors, such as a processor 1204 in the network node 210 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the network node 210. One such carrier may be in the form of a CD ROM disc. It is however feasible with other data carriers such as a memory stick. The computer program code may furthermore be provided as pure program code on a server and downloaded to the network node 210.

The network node 210 may further comprise a memory 1205 comprising one or more memory units. The memory 1205 is arranged to be used to store obtained information, store data, configurations, schedulings, and applications etc. to perform the methods herein when being executed in the network node 210.

In some embodiments, the network node 210 may receive information from the wireless device 230, the host computer 250, or any network node or device through a receiving port 1206. In some embodiments, the receiving port 1206 may be, for example, connected to one or more antennas in network node 210. In other embodiments, the network node 210 may receive information from another structure in the wireless communication network 200 through the receiving port 1206. Since the receiving port 1206 may be in communication with the processor 1204, the receiving port 1206 may then send the received information to the processor 1204. The receiving port 1206 may also be configured to receive other information.

The processor 1204 in the network node 210 may be further configured to transmit or send information to e.g., the wireless device 230, the host computer 250, or any network node or device, through a sending port 1207, which may be in communication with the processor 1204, and the memory 1205.

Those skilled in the art will also appreciate that the sending module 1201, the obtaining module 1202, and the other modules 1203 described above may refer to a combination of analog and digital modules, and/or one or more processors configured with software and/or firmware, e.g., stored in memory, that, when executed by the one or more processors such as the processor 1204, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1201-1203 described above may be implemented as one or more applications running on one or more processors such as the processor 1204.

Thus, the methods according to the embodiments described herein for the network node 210 may be respectively implemented by means of a computer program 1208 product, comprising instructions, i.e., software code portions, which, when executed on at least one processor 1204, cause the at least one processor 1204 to carry out the actions described herein, as performed by the network node 210. The computer program 1208 product may be stored on a computer-readable storage medium 1209. The computer-readable storage medium 1209, having stored thereon the computer program 1208, may comprise instructions which, when executed on at least one processor 1204, cause the at least one processor 1204 to carry out the actions described herein, as performed by the network node 210. In some embodiments, the computer-readable storage medium 1209 may be a non-transitory computer-readable storage medium, such as a CD ROM disc, a memory stick, or stored in the cloud space. In other embodiments, the computer program 1208 product may be stored on a carrier containing the computer program, wherein the carrier is one of an electronic signal, optical signal, radio signal, or the computer-readable storage medium 1209, as described above.

In a particular embodiment, the network node 210 comprises: a) the sending module 1201 configured to send, to the wireless device 230, the first message configured to grant the wireless device 230 at least two uplink transmissions, and b) the obtaining module 1202 configured to obtain, from the wireless device 230, on time-frequency resources configured to be indicated in the first granted uplink transmission of the at least two uplink transmissions, the indication indicating whether or not the second granted uplink transmission of the at least two uplink transmissions is to be used by the wireless device 230.

In a further particular embodiment, the network node 210 comprises: the obtaining module 1202, further configured to obtain data from the wireless device 230, using the second granted uplink transmission.

Embodiments herein may be understood to relate to: NR, LTE, LTE-M, eMTC, NB-IoT, RAR, networked society, random access, early data, grant, scheduling.

Selected Examples of Embodiments Herein:

Selected examples of embodiments herein may be considered as follows:

Example 1. A method, performed by a wireless device 230, the method comprising:

receiving 401, from a network node 210, a first message granting the wireless device 230 two uplink transmissions, and indicating 402, to the network node 210, on time-frequency resources indicated in a first granted uplink transmission of the two uplink transmissions, whether or not a second granted uplink transmission of the two uplink transmissions is to be used by the wireless device 230.

The wireless device 230 and the network node 210 may be operating in the wireless communication network 200.

The two granted uplink transmissions may be referred to herein as the two grants, the two uplink grants, or the two provided grants.

Operating in the wireless communication network 200, may be understood as e.g., operating in connection with, or via the wireless communication network 200.

Receiving may be understood as e.g., obtaining.

Is to be used may be understood as e.g., will be used.

In a particular example, the wireless communication network 200 is an LTE network. The wireless communication network 200 may also be referred to herein as the network 210.

Example 2. The method according to example 1, further comprising:

transmitting 403 data to the network node 210, using the second granted uplink transmission.

Example 3. The method according to any of examples 1-2, wherein the first message is a message 2 (Msg 2) and the data is transmitted in a second message, the second message being a message 3 (Msg 3).

Example 4. The method of according to any of examples 1-3, wherein the first message granting the two uplink transmissions comprises an explicit indication within the first message that two uplink transmissions have been granted.

That two uplink transmissions have been granted may also be referred to as e.g., that two uplinks have been granted.

Example 5. The method of according to any of examples 1-4, wherein the time-frequency resources for the two uplink transmissions are overlapping.

Example 6. The method of according to any of examples 1-5, wherein the indicating 402 is provided in one of:

a. a MAC control element, b. reserved R-bits in a power headroom report, c. a logical channel identifier in a MAC PDU sent in UL-SCH, d. one or more bits in an RRC message transmitted as part of a Msg3, e. an encoding format for Msg3, and f. a modulation format for Msg3.

Example 7. A computer program 1009, comprising instructions which, when executed on at least one processor 1005, cause the at least one processor 1005 to carry out the method according to any one of examples 1 to 6.

Example 8. A computer-readable storage medium 1010, having stored thereon a computer program 1009, comprising instructions which, when executed on at least one processor 1005, cause the at least one processor 1005 to carry out the method according to any one of examples 1 to 6.

Example 9. A method, performed by a network node 210, the method comprising:
  sending 501, to a wireless device 230, a first message granting the wireless device 230 two uplink transmissions, and
  obtaining 502, from the wireless device 230, on time-frequency resources indicated in a first granted uplink transmission of the two uplink transmissions, an indication indicating whether or not a second granted uplink transmission of the two uplink transmissions is to be used by the wireless device 230.

The wireless device 230 and the network node 210 may be operating in the wireless communication network 200.

Example 10. The method according to example 9, further comprising:
  obtaining 503 data from the wireless device 230, using the second granted uplink transmission.

Example 11. The method according to any of examples 9-10, wherein the first message is a message 2 (Msg 2) and the data is obtained in a second message, the second message being a message 3 (Msg 3).

Example 12. The method of according to any of examples 9-11, wherein the first message granting the two uplink transmissions comprises an explicit indication within the first message that two uplink transmissions have been granted.

Example 13. The method of according to any of examples 9-12, wherein the time-frequency resources for the two uplink transmissions are overlapping.

Example 14. The method of according to any of examples 9-13, wherein the indication is provided in one of:
  a. a MAC control element,
  b. reserved R-bits in a power headroom report,
  c. a logical channel identifier in a MAC PDU sent in UL-SCH,
  d. one or more bits in an RRC message transmitted as part of a Msg3,
  e. an encoding format for Msg3, and
  f. a modulation format for Msg3.

Example 15. A computer program 1208, comprising instructions which, when executed on at least one processor 1204, cause the at least one processor 1204 to carry out the method according to any one of examples 9 to 14.

Example 16. A computer-readable storage medium 1209, having stored thereon a computer program 1208, comprising instructions which, when executed on at least one processor 1204, cause the at least one processor 1204 to carry out the method according to any one of examples 9 to 14.

To perform the method actions performed by the wireless device 230, the wireless device 230, may comprise the following arrangement described below and depicted in FIG. 9P.

Example 17. A wireless device 230 comprising:
  a receiving module 901 configured to receive, from a network node 210, a first message configured to grant the wireless device 230 two uplink transmissions, and
  an indicating module 902 configured to indicate, to the network node 210, on time-frequency resources configured to be indicated in a first granted uplink transmission of the two uplink transmissions, whether or not a second granted uplink transmission of the two uplink transmissions is to be used by the wireless device 230.

The wireless device 230 and the network node 210 may be configured to operate in the wireless communication network 200.

Example 18. The wireless device 230 according to example 17, further comprising:
  a transmitting module 903 configured to transmit data to the network node 210, using the second granted uplink transmission.

Example 19. The wireless device 230 according to any of examples 17-18, wherein the first message is a message 2 (Msg 2) and the data is configured to be transmitted in a second message, the second message being a message 3 (Msg 3).

Example 20. The wireless device 230 of according to any of examples 17-19, wherein the first message configured to grant the two uplink transmissions comprises an explicit indication within the first message that two uplink transmissions have been granted.

Example 21. The wireless device 230 of according to any of examples 17-20, wherein the time-frequency resources for the two uplink transmissions are overlapping.

Example 22. The wireless device 230 of according to any of examples 17-21, wherein the indication is configured to be provided in one of:
  a. a MAC control element,
  b. reserved R-bits in a power headroom report,
  c. a logical channel identifier in a MAC PDU sent in UL-SCH,
  d. one or more bits in an RRC message configured to be transmitted as part of a Msg3,
  e. an encoding format for Msg3, and
  f. a modulation format for Msg3.

Example 17b. A wireless device 230 configured to:
  receive, from a network node 210, a first message configured to grant the wireless device 230 two uplink transmissions, and
  indicate, to the network node 210, on time-frequency resources configured to be indicated in a first granted uplink transmission of the two uplink transmissions, whether or not a second granted uplink transmission of the two uplink transmissions is to be used by the wireless device 230.

The wireless device 230 and the network node 210 may be configured to operate in the wireless communication network 200.

Example 18b. The wireless device 230 according to example 17b, being further configured to:
  transmit data to the network node 210, using the second granted uplink transmission.

Example 19b. The wireless device 230 according to any of examples 17b-18b, wherein the first message is a message 2 (Msg 2) and the data is configured to be transmitted in a second message, the second message being a message 3 (Msg 3 ).

Example 20b. The wireless device 230 of according to any of examples 17b-19b, wherein the first message configured to grant the two uplink transmissions comprises an explicit indication within the first message that two uplink transmissions have been granted.

Example 21b. The wireless device 230 of according to any of examples 17b-20b, wherein the time-frequency resources for the two uplink transmissions are overlapping.

Example 22b. The wireless device 230 of according to any of examples 17b-21b, wherein the indication is configured to be provided in one of:
  a. a MAC control element,
  b. reserved R-bits in a power headroom report,
  c. a logical channel identifier in a MAC PDU sent in UL-SCH,
  d. one or more bits in an RRC message configured to be transmitted as part of a Msg3,
  e. an encoding format for Msg3, and f. a modulation format for Msg3.

To perform the method actions performed by the network node 210, the network node 210, may comprise the following arrangement described below and depicted in FIG. 10P.

Example 23. A network node 210 comprising:
 a sending module 1001 configured to send, to a wireless device 230, a first message configured to grant the wireless device 230 two uplink transmissions, and
 an obtaining module 1002 configured to obtain, from the wireless device 230, on time-frequency resources configured to be indicated in a first granted uplink transmission of the two uplink transmissions, an indication indicating whether or not a second granted uplink transmission of the two uplink transmissions is to be used by the wireless device 230.

The wireless device 230 and the network node 210 may be configured to operate in the wireless communication network 200.

Example 24. The network node 210 according to example 23, wherein the obtaining module 1002 is further configured to obtain data from the wireless device 230, using the second granted uplink transmission.

Example 25. The network node 210 according to any of examples 23-24, wherein the first message is a message 2 (Msg 2) and the data is configured to be obtained in a second message, the second message being a message 3 (Msg 3).

Example 26. The network node 210 of according to any of examples 23-25, wherein the first message configured to grant the two uplink transmissions comprises an explicit indication within the first message that two uplink transmissions have been granted.

Example 27. The network node 210 of according to any of examples 23-26, wherein the time-frequency resources for the two uplink transmissions are overlapping.

Example 28. The network node 210 of according to any of examples 23-27, wherein the indication is configured to be provided in one of:
 a. a MAC control element,
 b. reserved R-bits in a power headroom report,
 c. a logical channel identifier in a MAC PDU sent in UL-SCH,
 d. one or more bits in an RRC message configured to be transmitted as part of a Msg3,
 e. an encoding format for Msg3, and
 f. a modulation format for Msg3.

Example 23b. A network node 210 configured to:
 send, to a wireless device 230, a first message configured to grant the wireless device 230 two uplink transmissions, and
 obtain, from the wireless device 230, on time-frequency resources configured to be indicated in a first granted uplink transmission of the two uplink transmissions, an indication indicating whether or not a second granted uplink transmission of the two uplink transmissions is to be used by the wireless device 230.

The wireless device 230 and the network node 210 may be configured to operate in the wireless communication network 200.

Example 24b. The network node 210 according to example 23b, wherein the network node 210 is further configured to obtain data from the wireless device 230, using the second granted uplink transmission.

Example 25b. The network node 210 according to any of examples 23b-24b, wherein the first message is a message 2 (Msg 2) and the data is configured to be obtained in a second message, the second message being a message 3 (Msg 3).

Example 26b. The network node 210 of according to any of examples 23b-25b, wherein the first message configured to grant the two uplink transmissions comprises an explicit indication within the first message that two uplink transmissions have been granted.

Example 27b. The network node 210 of according to any of examples 23b-26b, wherein the time-frequency resources for the two uplink transmissions are overlapping.

Example 28b. The network node 210 of according to any of examples 23b-27b, wherein the indication is configured to be provided in one of:
 a. a MAC control element,
 b. reserved R-bits in a power headroom report,
 c. a logical channel identifier in a MAC PDU sent in UL-SCH,
 d. one or more bits in an RRC message configured to be transmitted as part of a Msg3,
 e. an encoding format for Msg3, and
 f. a modulation format for Msg3.

Transmission of Early Data in Message 3 (Msg3 ) Via a Dual Grant

The proposal according to the first approach mentioned earlier may be understood to allow use of early data in a backwards-compatible fashion in Msg3. The dual grant-approach may be understood to be backwards compatible, so that the new UEs, e.g., Rel-15 onwards, may be able to use the information embedded in the RAR message, and/or UL grant, while UEs not supporting the early data feature may disregard the provided additional information to support the feature.

It is to be noted that any feature of any of the examples disclosed herein may be applied to any other example, wherever appropriate. Likewise, any advantage of any of the examples may apply to the other examples, and vice versa. Other objectives, features and advantages of the enclosed examples will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Some of the examples contemplated herein will now be described more fully hereinafter with reference to the accompanying drawings. Other embodiments, however, are contained within the scope of this disclosure and examples described in this section should not be construed as limited to only the examples set forth herein; rather, these examples are provided by way of illustrative examples to convey the scope of the concept of the first approach to those skilled in the art. Like numbers refer to like elements throughout the description.

Figure 13A:
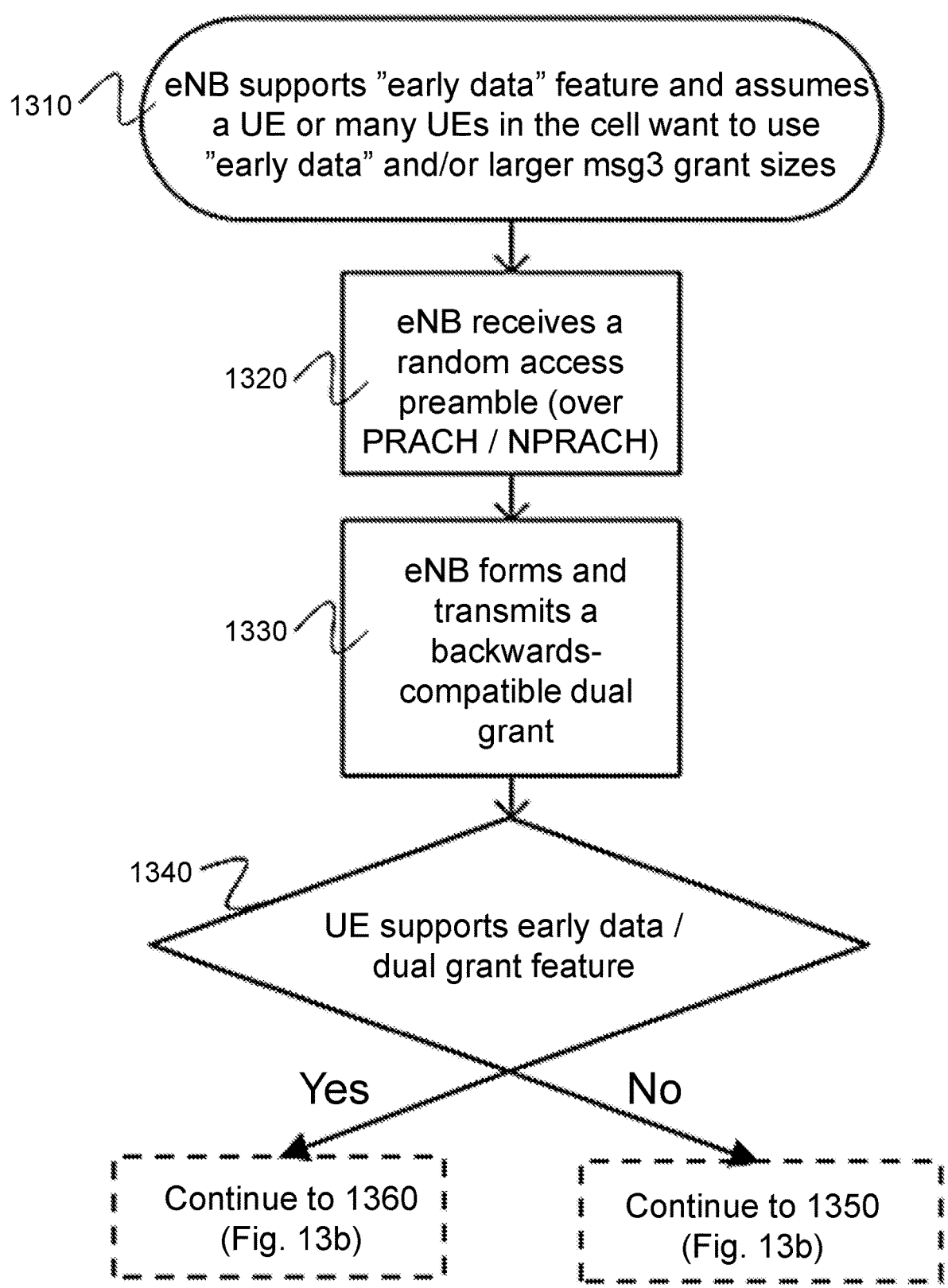
FIG. 13a is a first part of a flowchart illustrating an example of a method according to the description in a first approach described herein. It continues in FIG. 13b.
Figure 13B:
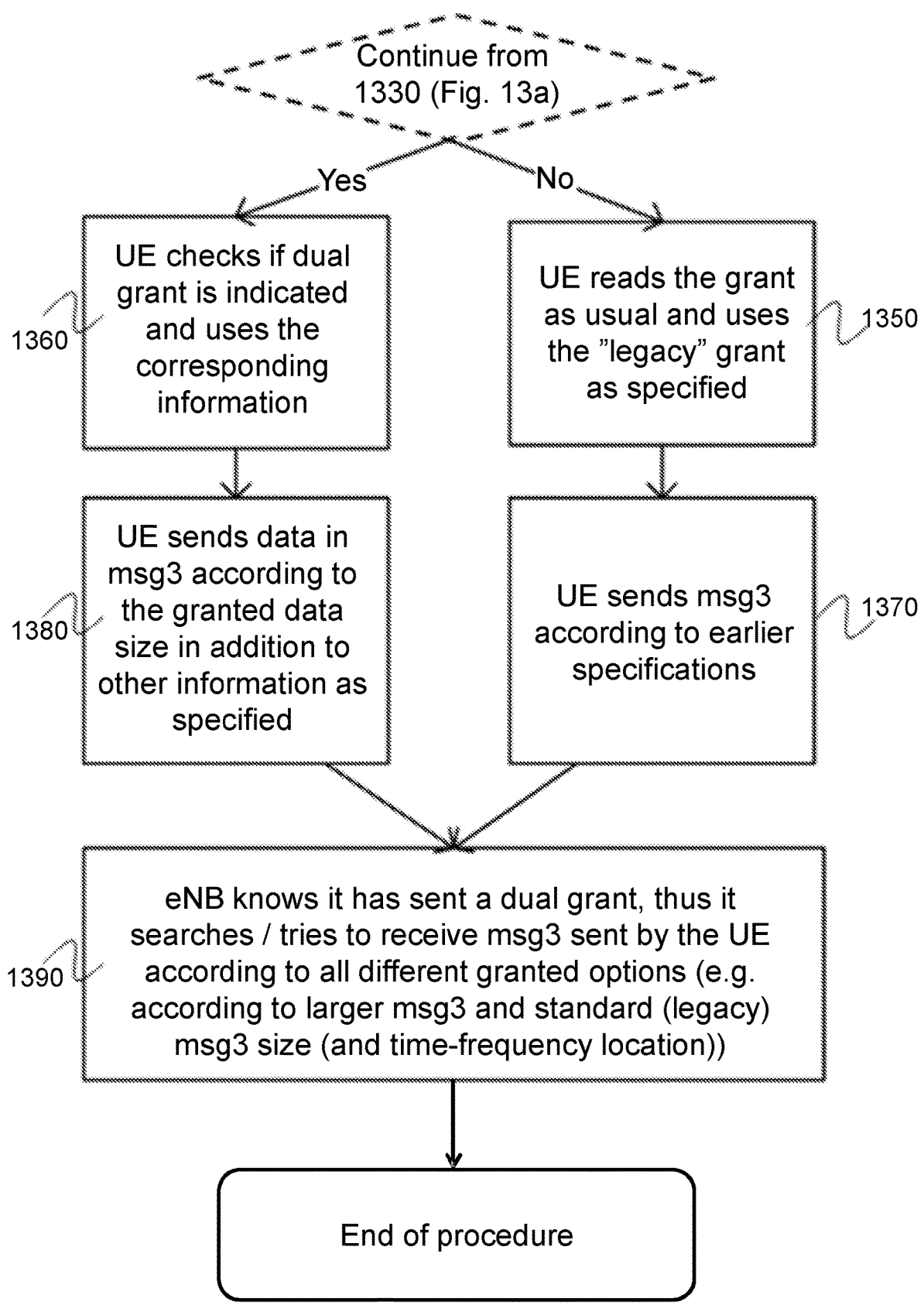
FIG. 13b is a second part of the flowchart of FIG. 13a illustrating an example of a method according to the description in a first approach described herein.

FIG. 13 is a flowchart illustrating a high-level description of a method that may be performed according to the first approach. As indicated in 1310, the assumption is that the eNB, which may be understood to support the early data feature, may not know with 100% certainty if a UE supports user data in Msg3 or not, but it may have a way of making a decision that a larger Msg3 grant may be used. The method on how the eNB may make such a detection or assumption of UEs supporting the feature may be left up to eNB implementation and does not need to be specified. At 1320, the eNB receives a random access preamble from a UE, over the PRACH or the NPRACH. At 1330, the eNB sends a first UL grant in a RAR, which may be understood to be backwards compatible, but where either the UL grant or the RAR message may contain an indication that a larger second UL grant for Msg3, that is, containing user plane data, is also provided, and may be used for transmission. In some examples, such an indication may be missing, and the may UE deduce whether this is possible from the presence of the second UL grant itself. The actual first UL grant size may be typically kept small, as legacy, and the possibility to send a larger Msg3 may be indicated by an indicator for second UL grant provided, e.g., in: a) either in the UL grant itself, by using some bit/parameter combination in a backwards compatible way; or b) in the MAC Random Access Response message, by using existing reserved bits, e.g., 'R' in the specification, a special Radio Network Temporary Identifier (RNTI) range, or other means. The reserved 'R'-bits in the MAC header and/or in the RAR itself may be used. As an example of the RNTI, a certain range of the Temporary C-RNTIs provided in the RAR may be used for this indication, and the range may be indicated in a System Information Broadcast. Yet another alternative the possibility to send a larger Msg3 may be indicated by c) the presence of a new Random Access Preamble IDentifier (RAPID), see detailed description below.

As indicated at 1340, there may be two different ways to proceed, based on whether the UE supports the early data/dual grant feature or not.

If the UE, as shown in 1350, does not support a larger Msg3 or early data in Msg3, it may receive the RAR message containing a first UL grant for Msg3 looking like a legacy message type. Thus, such UEs may operate as if the feature was not in use, that is, according to earlier specifications, for example v14.2. of TS36.321.

If, as shown in 1360, the UE supports the early data feature and wants to send data in Msg3, it may interpret the message accordingly, receive a second UL grant for a larger Msg3, and include user data in the message. The UE may interpret the received message according to future, e.g., 3GPP Rel-15 specifications.

The UE may then, as shown in 1380, transmit the Msg3 either i) using the first UL grant, e.g., as in Release 13 or 14, or, if the early data feature is not supported, in 1370, sending a transmission containing RRC and or Non-Access Stratum (NAS) protocol message(s) and the UE identifier, or ii) using the provided larger second UL grant for uplink data, multiplexing user plane data with the content described in bullet a) above, as shown in 1380. As shown in 1390, the eNB may be understood to know it has sent the dual grant. Thus, the eNB may search, or try to receive, the Msg3 sent by the UE according to all different granted options. The eNB may try to make the detection based on the legacy first UL, grant and the larger second UL grant, as it may not know in advance if the UE supports the early data feature or not.

Figure 14:
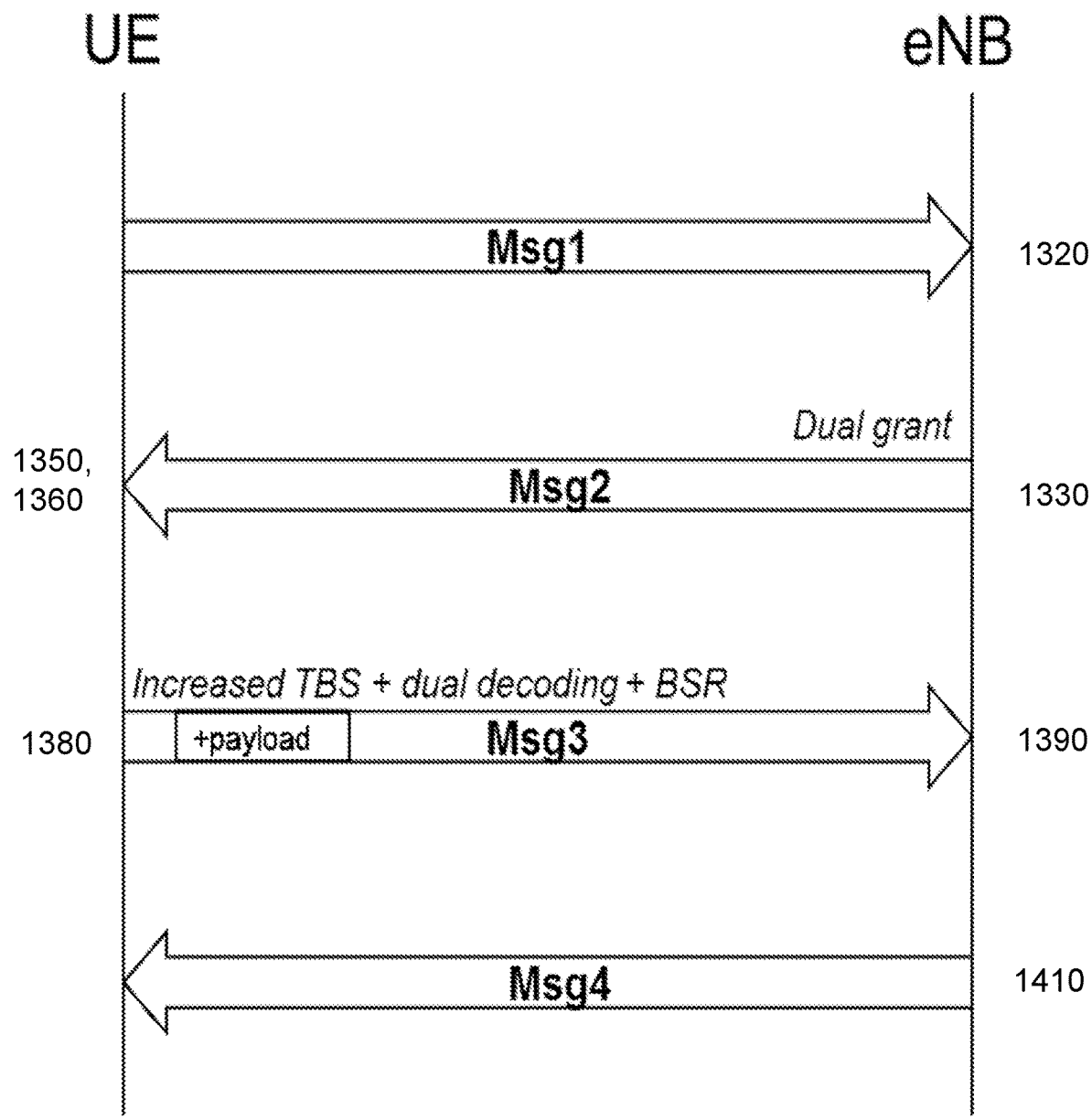
FIG. 14 is a schematic diagram illustrating an example of the signalling on a general level using the dual grant, according to the first approach described herein.

FIG. 14 is a schematic diagram depicting a non-limiting example of the signalling, on a general level, using the dual grant that may take place in a random access procedure according to the examples just described. FIG. 14 depicts selected actions described above, as indicated by the same reference numbers. In response to receiving the dual grant, in 1380, the UE sends a Msg3 message with a payload characterized by an increased Transport Block Size (TBS), dual decoding indication, that is, the indication of whether the second grant will also be utilized, and Buffer Size Report. According to the Msg3 received, in 1390, the eNB sends back a Msg4 to the UE at 1410, concluding the contention resolution.

The different steps of the first approach will be now described with further detail.

Step 1 (1320): Msg1 Reception and eNB Decision on Dual Grant

It may be understood that disclosed herein is explanation, and use, of a dual grant in Msg2. The exact method on how eNB may make a decision of when to use such dual grant, and the size of the second UL grant may vary depending on implementation. Some potential methods may include the eNB making the dual grant decision based on: a) typical UE capabilities seen previously in the cell, b) path-loss estimated from the random access preamble transmission, c) partitioning the random access preamble space, e.g., of (Narrowband) Physical Random Access Channel ((N) PRACH) resources, and using specific preambles to indicate support for the early data feature, d) extension of existing preamble space, either by addition of more preambles or time-/frequency-coding of existing ones as an overlay, e.g., transmitting on multiple tones, or using a different f-hopping pattern for NB-IoT, e) coverage enhancement level used by the UE, e.g., the (N)PRACH resource selected by the UE, f) the size of the second UL grant, may be based on e.g., the maximum number of bits that may reliably be transmitted in Msg3 based on the estimation of the channel from the reception of Msg1, and g) using the dual grant may depend on the possibility to provide a larger second UL grant based the estimation of the channel from the reception of Msg1, that is on whether it may be possible to include a second grant at all.

Figure 15:
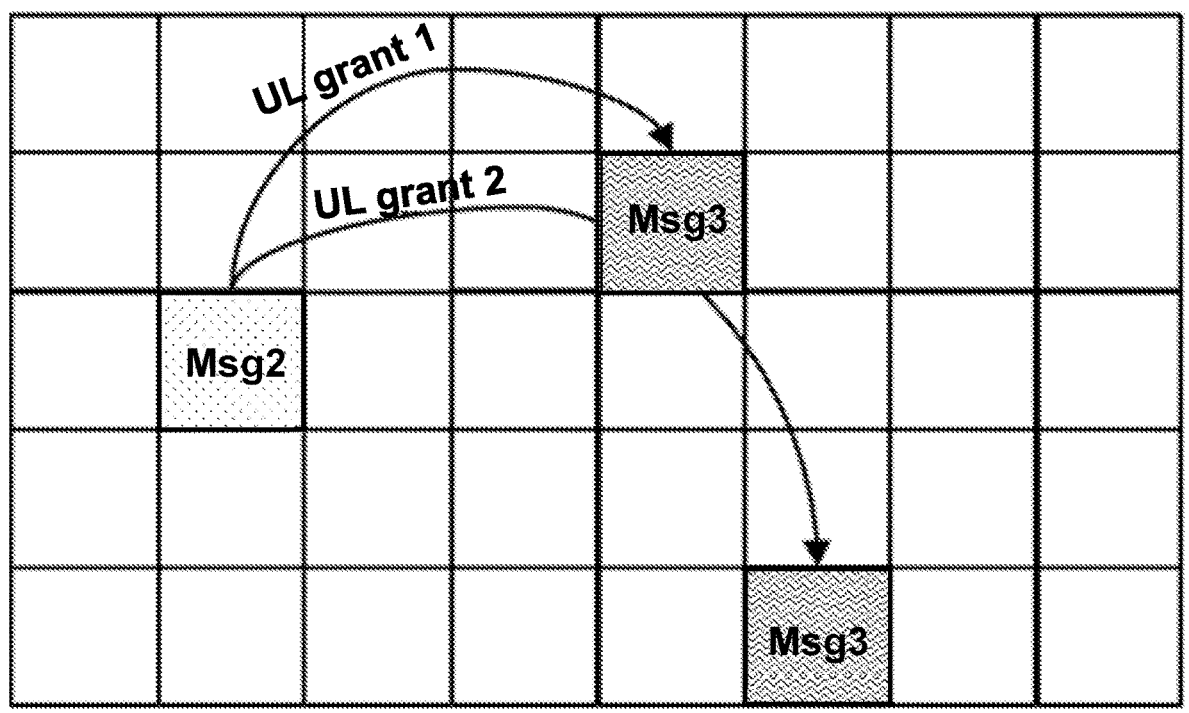
FIG. 15 is a schematic diagram illustrating providing dual grants in separate time- and frequency-resources, according to the first approach described herein.

As the eNB may not know the UE identity or capability, it may make an assumption that the UE may support early data, and provide the dual grant as exemplified above. If the eNB thinks no UEs support early data, it may continue to provide UL grants as in legacy networks. In one example, the eNB may always provide a dual grant, and if the second UL grant is at a later point in time, as depicted in FIG. 15, the eNB may reuse and/or free-up these resources if it sees that the UE uses the first UL grant. This may be left up to implementation. FIG. 15 is a schematic illustration of providing dual grants in separate time- and frequency-resources, according to examples herein. The first UL grant "UL grant 1" is provided for a first set of time-frequency resources to be used for a first Msg3, and a second UL grant "UL grant 2" is provided for a second set of time-frequency resources at a later time point. This resources may be used for a second Msg3, or if the UE has used the first UL grant, re-used by the eNB, e.g., to schedule another UE.

Step 2 (1330): Transmission of Msg2 Including the Dual Grant

When the eNB assumes the UE supports and may want to use early data, a dual grant may be provided to the UE.

Figure 16:
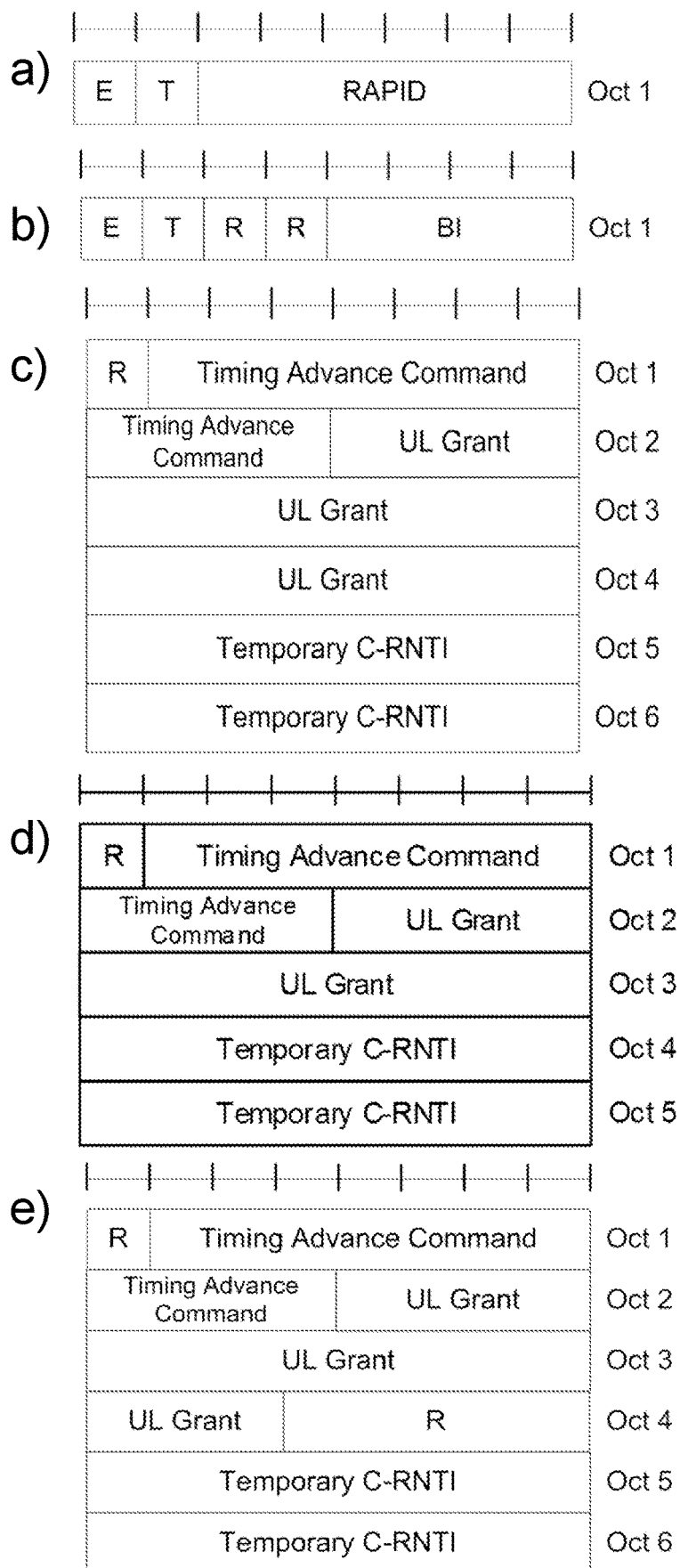
FIG. 16 is a schematic diagram illustrating an MAC subheader and RAR formats according to current specifications, from TS36.321 v14.2.0.

Indication of Early Data:

There are different ways in which the possibility of early data transmission may be indicated to the UE. Some examples are discussed next. The following list of examples are ways in which the indication of presence of dual grant, that is, use of the early data feature, may be indicated using the legacy RAR formats and signalling. The MAC subheader and RAR formats from the MAC specification TS36.321 v14.2.0 are shown in FIG. 16 for reference.

Figure 17:
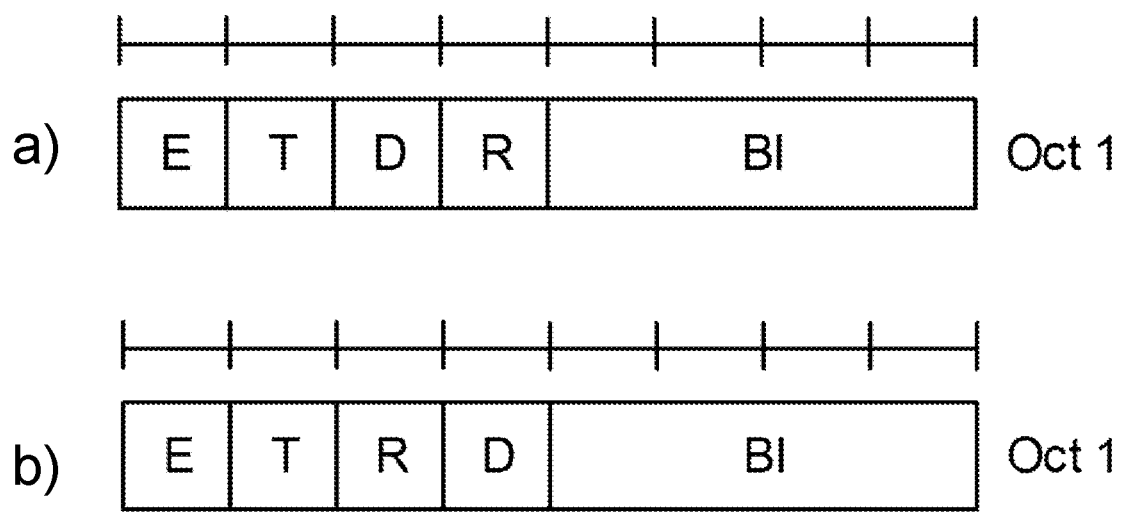
FIG. 17 is a schematic diagram illustrating examples of alternative definitions of BI subheader, according to examples in the first approach described herein.

In one example, the dual grant may be indicated using the "R" bit in the MAC header for RAR by setting an "R" bit to one. This may be done using either of the "R" bits in the Backoff Indicator (BI) subheader. FIG. 17 is a schematic diagram representing alternative definitions of the BI subheader according to some examples. In FIG. 17 a), the first R bit may be used, and in FIG. 17 b), the second R bit may be used. Specification text may additionally describe a "D" bit as bit indicating the presence of a dual grant when the bit is set to one. In the BI subheader, the backoff value may be set to zero ms, BI index 0, in order to avoid that UEs actually use backoff in subsequent random access attempts [1].

Figure 18:
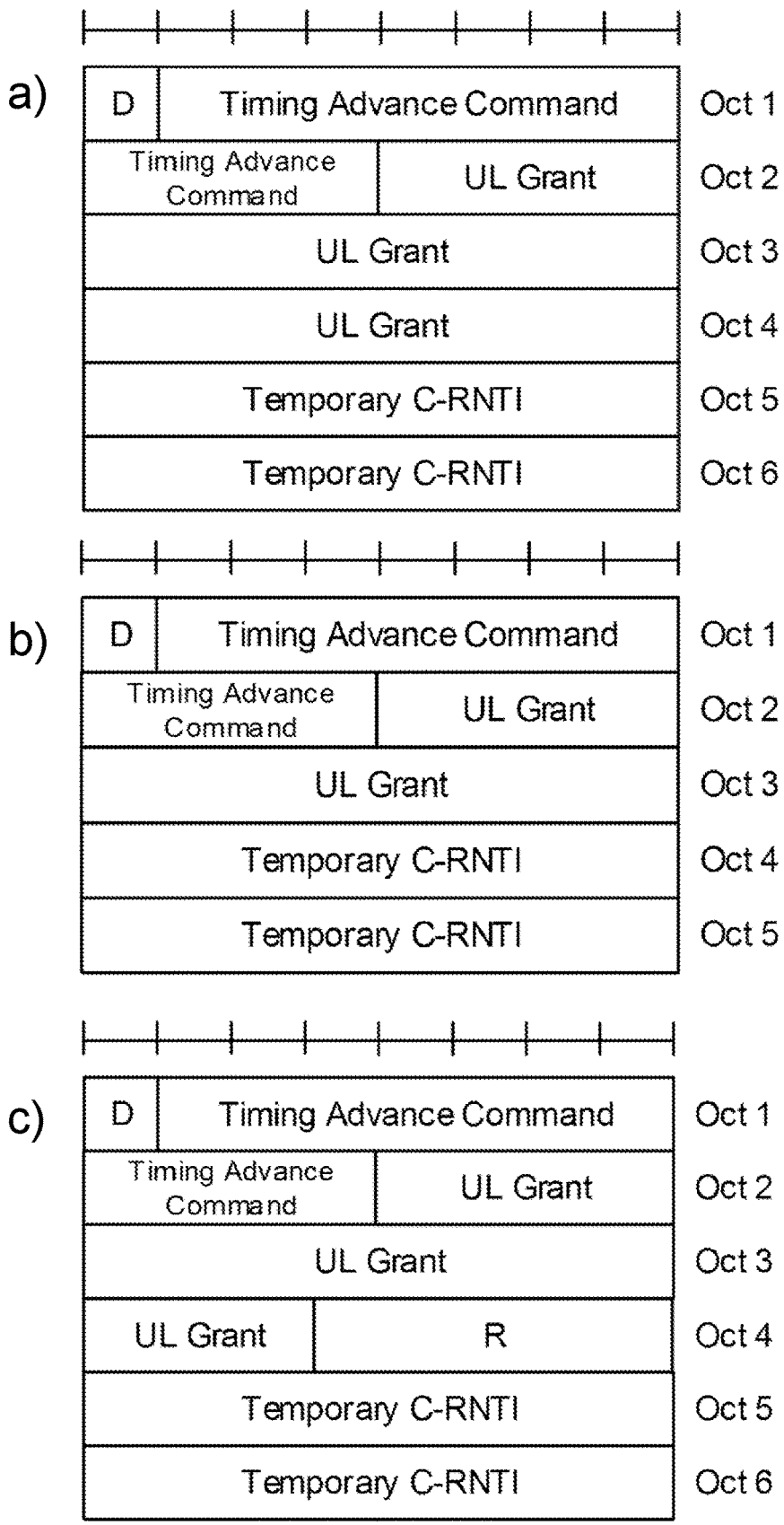
FIG. 18 is a schematic diagram illustrating examples of MAC RAR, MAC RAR for PRACH coverage level 2 or 3 and MAC RAR for NB-IoT, from top to bottom, respectively.

In one particular example, the dual grant may be indicated using the "R" bit in the MAC RAR by setting the "R" bit to one. The R bit may in that case be named differently, e.g., "D" bit. FIG. 18 is a schematic diagram representing examples of a) a MAC RAR, b) a MAC RAR for PRACH coverage level 2 or 3 and c) a MAC RAR for NB-IoT, from top to bottom, respectively. The "D" bit may be used to indicate the presence of dual grant and early data feature by setting the bit to one.

In some examples, the MAC RAR "D" bits and the "D" bits in the BI subheader may be used together. For example, the UL grant may be read according to legacy specifications, but a combination of "D" bits may indicate a multiplier for the transport block size (TBS) given in the grant. The used bit combinations may be included in a table in the specifications, and therefore fixed, or signalled in system information.

Figure 19:
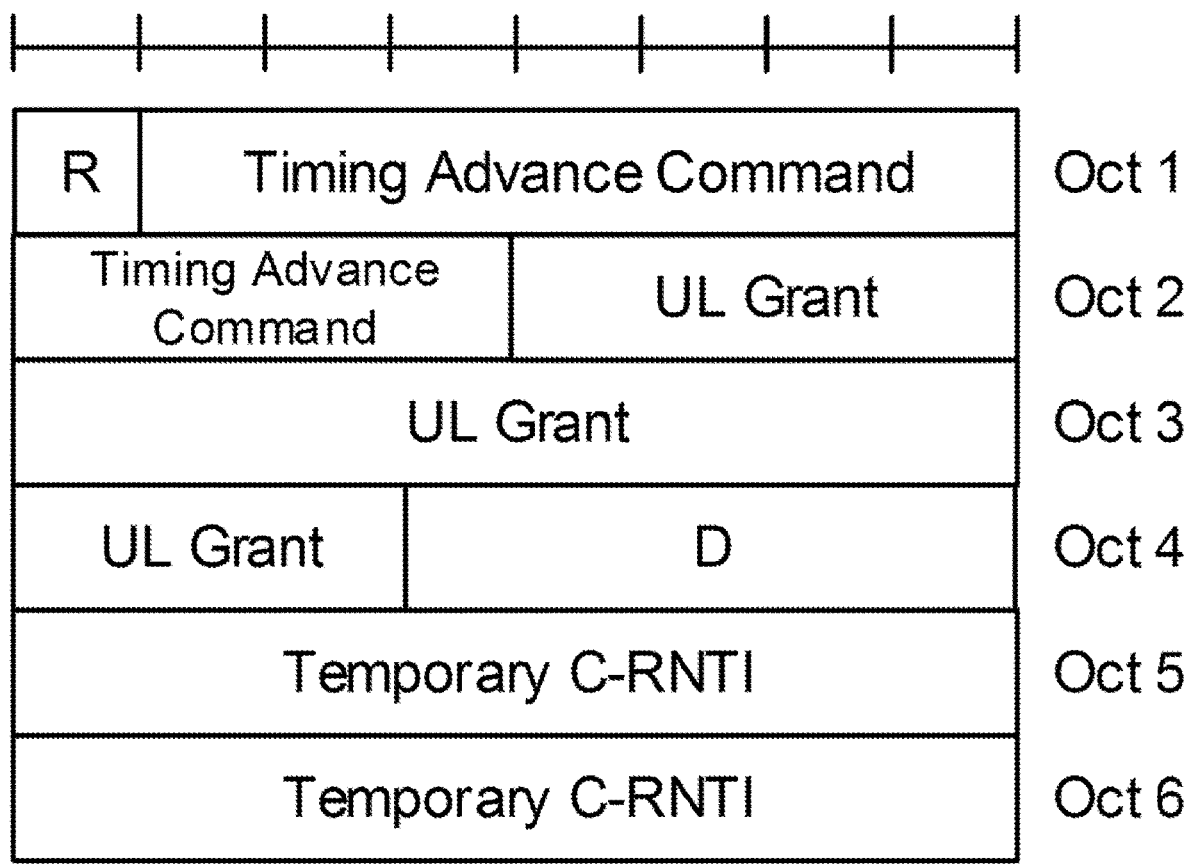
FIG. 19 is a schematic diagram illustrating an example of MAC RAR for NB-IoT.

For NB-IoT, in one example, the "R" bits between the "UL grant" and the "Temporary C-RNTI" fields may be used to indicate the dual grant. FIG. 19 is a schematic diagram representing an example of a MAC RAR for NB-IoT. The "D" bits may be used to indicate the presence of the dual grant and early data feature. Either one bit in the 5-bit bit field may be used for indication, or a combination of the bits may be used. It may be also possible, as above, to use multiple bits to indicate additional information, such as the grant size, e.g., compared to the legacy UL grant size.

In one example, the TC-RNTI space may be divided, so that certain range of the TC-RNTIs may be used to indicate presence of dual grant. The TC-RNTI range may be defined in the System Information (SI).

The use for the early data feature may be considered to be implicit from the presence of a second UL grant. It may be noted that the use of an explicit indicator may make the UE procedure and processing less demanding, but is not always strictly required. That is, using the explicit indication may provide gains in terms of power and resource consumption.

In another example, the indication of early data may be provided by the use of an extended RAR window, which may be signalled in System information, and/or a second MAC RA response message PDU in the RAR window.

Yet in another example, the indication of early data may be provided by a new RAPID, and/or a new RAR format, and/or an extension of the MAC RA response message PDU.

The use of the early data feature may also be indicated in a System Information (SI) broadcast.

In yet a further example, the use of the early data feature may be pre-defined in a standard.

In another example, the use of the early data feature may be indicated in dedicated RRC signalling. It may be noted that this may enable the feature only in RRC_CONNECTED mode, which is less useful, but it may potentially be combined with any of the other options.

In yet another example, the use of the early data feature may be indicated in the Downlink Control Information (DCI) of the (N)PDCCH scheduling of Msg 2.

It may also be possible to use a combination of the above. For example, using both BI subheader "R" bits and the MAC RAR "R" bits, in total three bits may be used.

Second UL Grant for Early Data:

The second UL grant may be provided to the UE in any of the following eight examples, e.g., when the dual grant indication is sent.

In a first example (example 1), the second grant may be provided as pre-defined in the specification, where the size and scheduling of the following Msg3 may be fixed. For example, the above indication may dynamically, per attempt, indicate to the UE whether it is allowed to use this second UL grant.

In a second example (example 2), the second grant may be provided as defined in system information, where the second UL grant may be semi-static and may be changed only through system information change.

In a third example (example 3), if multiple bits are used for dual grant indication, both alternatives that of the first example, and that of the second example may include multiple options indicated by the bit combination. For example, if the Back off indicator is set to zero, i.e., BI-index=0, there may be a 0 ms delay introduced, but the two 'R'-bits in the BI subheader may be used for this purpose. In this case, the specification may include a table of different combinations, or SI may indicate multiple options. For example, if two reserved 'R'-bits are used, the following table, Table 2, may be provided in system information:

TABLE 2

| Bit sequence: | Second UL grant: |
| --- | --- |
| 00 | UL grant 1 |
| 01 | UL grant 2 |
| 10 | UL grant 3 |
| 11 | UL grant 4 |

In a fourth example (example 4), the second grant may be defined as a new MAC subheader and MAC RAR. UEs not capable of the early data feature, e.g. Release 13 and 14 UEs, may read the subheader and MAC according to the Release 13 RAPID format. UEs supporting early data may first, possibly, note that the dual grant is indicated, e.g., in an "R" bit in BI subheader or system information, and read the new RAPID subheader and corresponding new RAR. For the new MAC RAR format, also a new format of the actual second UL grant may be defined. In this case, the "R" bit that may be set to indicate the early data feature may effectively indicate to a UE supporting the feature that it may need to be looking for an extended MAC subheader, and these new RAR formats. Legacy UEs may read the legacy formats according to the Release 13 RAPID format, and operate as expected per earlier specification versions.

Figure 20:
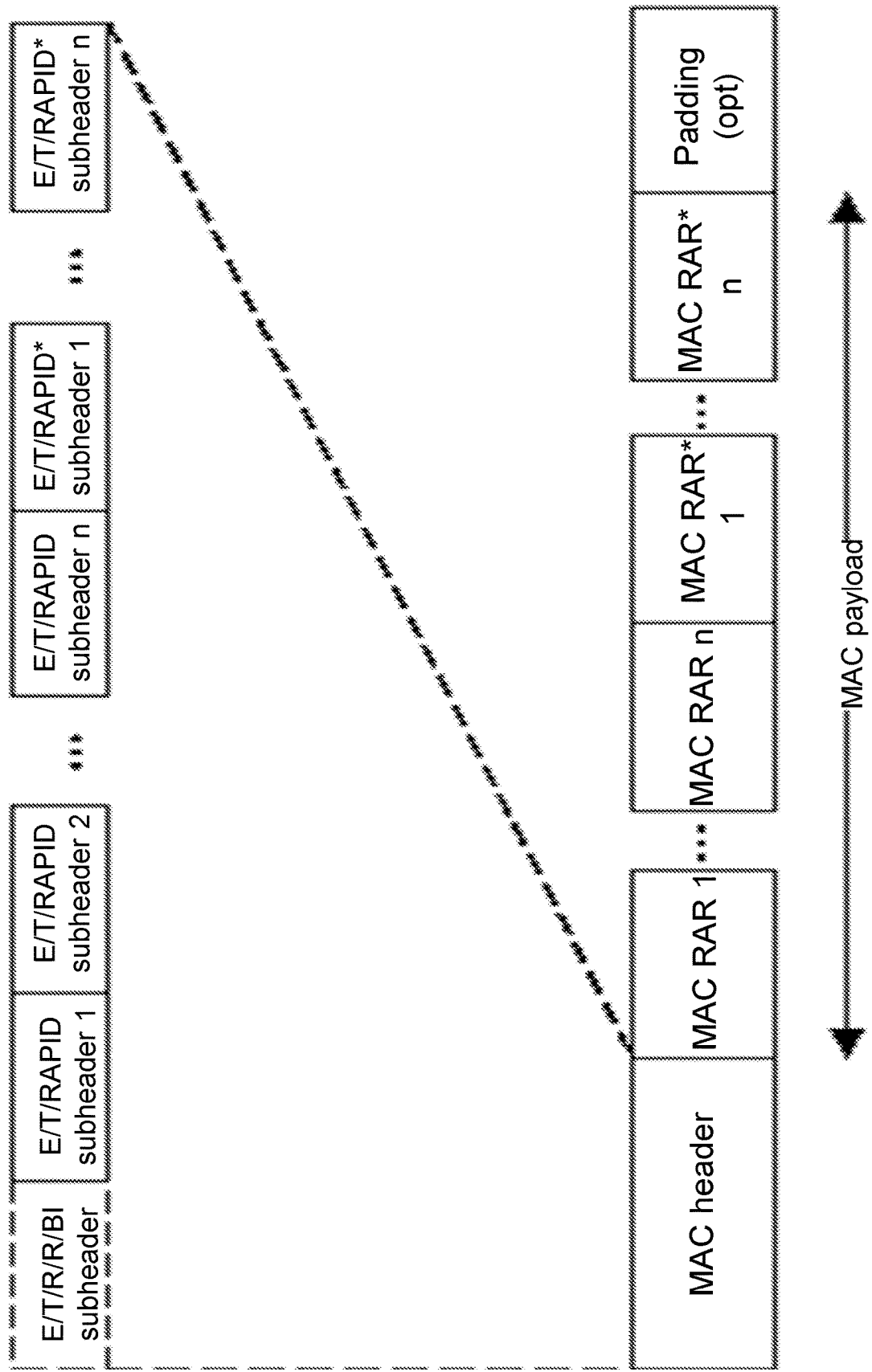
FIG. 20 is a schematic diagram illustrating an example of an extended MAC RAR PDU format.

In one example, UEs not capable of the early data feature, e.g. Release 13 and 14 UEs, may not be able to interpret this new RAPID format. The Release 13 RAPIDs may be put first, and the new early data RAPIDs put last in the MAC RA response message PDU, see FIG. 6.1.5-4 in TS 36.321 for reference. FIG. 20 is a schematic diagram representing an example of an extended MAC RAR PDU format.

As indicated in the Figure, the MAC header comprises a number n of subheaders comprising a RAPID, and n subheaders comprising RAPID*. RAPID* refers to RAPID identifying early data/dual grant capable UEs. It one example, the format may be the same as for legacy RAPID, where a UE may look for additional subheaders based on the early data/dual grant indication it has received. Likewise, the MAC payload may comprise n RAR and n RAR*, where RAR* may be understood to refer to RAR format for early data/dual grant capable UEs. The exact definition of RAR* may be similar to as in legacy or redefined e.g., to allow more options in the UL grant.

RAPID may be indicated using 6 bits, and in case 64 preambles are used, it may not be possible to indicate new ones. However, in all cases where less than 64 preambles are used, e.g., max 48 is used for NB-IoT, group A/B partitioning may be used, preambles in certain Coverage Enhanced/Enhancement (CE)-levels may be unused etc.. the preamble indexes for unused preambles may be re-used for RAPIDs indicating the new RAR format and the second UL grant for early data.

In another example, a RAPID subheader format for early data may be the same as in legacy, but the RAPID may be scrambled or transformed using a known function so that the legacy UEs may read just one RAPID subheader according to the ID of the sent preamble, and the UEs supporting the early data feature may additionally read the additional subheader with scrambled RAPID, and the corresponding MAC RAR. In this case, new RAR format and/or UL grant may be defined with the necessary information for the transmission of the early data.

In a fifth example (example 5), the second grant may be provided as an alternative, where the MAC RAR PDU may stay intact, and when the early data indication is set, the second UL grant may be defined as a function of the first UL grant. For example, the TBS of the second UL grant may be a multiplication of the TBS of the first grant, where the multiplication factor may be either a) pre-defined in the standard, b) indicated in System Information, c) included in the 'early indication', e.g., using multiple reserved 'R'-bits, d) sent via RRC signalling, see comment on this above. Or the second UL grant may be a certain step up in the TBS selection table compared to the first UL grant. The step may be indicated in the ways a) to c) above.

In a sixth example (example 6), the second grant may be provided as a new, second, MAC RA response message PDU containing the RAR, with a new format containing the second UL grant. This new MAC PDU may not be read by UEs not capable of the early data feature. That is, in a first example, the new MAC PDU may be scrambled with a new RA-RNTI, and in a second example, it may be transmitted outside the Release 13 RAR window. In the first example, the RA-RNTI range may for example be extended such that UEs not capable of the early data feature may not consider or even be aware of the new values, which may be communicated in a system information broadcast. In the second example, the RAR window may for example be extended, and only the UEs capable of early data may monitor this new MAC PDU in the extension. This may possibly be combined with example 4 above. It may be noted that, in this case, it may be very beneficial to have the early data indication, since this may limit the processing and power consumption in the UE. In a third example, when the second MAC RA response message PDU is dynamically scheduled, it may be indicated in the DCI on (N)PDCCH, such that it may not be read by UEs not capable of the early data feature.

In a seventh example (example 7), as alternative of the above, a new (second) MAC RA response message PDU containing the RAR with a new format containing the second UL grant may be used, by using new RA-RNTIs, such that it may be ensured that it may be decoded by UEs capable of early data, but not by other UEs.

Figure 21:
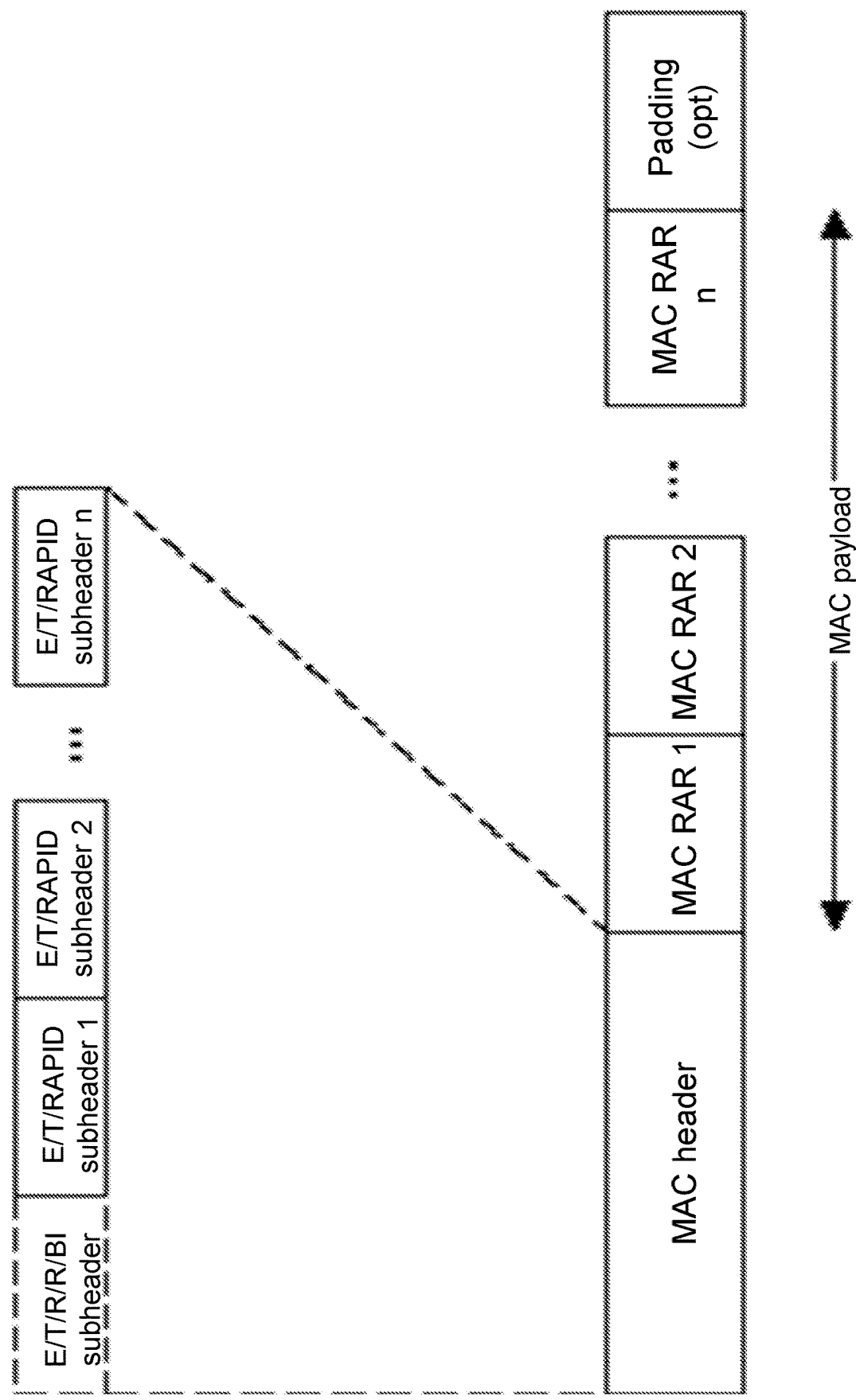
FIG. 21 is a schematic signalling diagram illustrating the current MAC subheader and RAR formats in TS36.321 v14.2.0.

In an eighth example (example 8), the new information may be put into the padding area of the RA response PDU, that is, the padding in FIG. 21. FIG. 21 is a schematic diagram representing an example the current MAC subheader and RAR formats in TS36.321 v14.2.0. As indicated in the Figure, the MAC header comprises a number n of subheaders comprising a RAPID. Likewise, the MAC payload may comprise n RAR and a padding. A UE supporting the new feature may know to look into the padding field if the feature has been indicated, e.g., using one of the options listed above. A UE not capable of the early data feature, e.g., a Release 13 or 14 UE, may ignore the area after the payload when an associated subheader has the 'E'-bit set to zero to indicate padding. The UEs supporting early data may disregard the first 'E'-bit set to zero in this case, and read the padding area including the new information structure, e.g., a new subheader format and/or new RAR message or similar information. The second occurrence of 'E'-bit set to zero may e.g., as before, be interpreted as that the subsequent byte will start to contain padding. The new information may also include index or indication to a translation function between the TBS and the DCI and/or an alternative DCI.

In one example, a new extensible sub-structure in the MAC RAR PDU may be introduced, where the padding field may include subheader and payload, as explained as one alternative above. This may also have the benefit of allowing possible future extensions of the PDU.

In one example, even more UL grants towards one UE may be sent simultaneously, and the UE may independently choose to use an UL grant according to the size of uplink data in its buffer, that is, a generalization from dual grant to multiple grant. For example, using alternative 4 above, multiple subheaders and RARs may be sent in one MAC PDU where only one indicator bit may need to be used. The UE may independently then select which of the UL grants to use in Steps 3 and 4.

Step 3 (1350). Reception of Msg2

If the UE supports the early data feature, it may check the presence of a dual grant indicator and/or of a second UL grant, if it is being used. If a dual grant is present, the UE may autonomously select whether to use the first or second UL grant for transmission of the Msg3. That is, if the UE acts according to the legacy UL grant, or the information conveyed in the dual grant. Such information may typically indicate a larger second UL grant for Msg3, and scheduling information, such as time/frequency/repetitions, to be used for the transmission of Msg3. The UE selection may be up to UE implementation, but may typically be based on the size of the UL buffer, if it may be able to fit all its data in to the second UL grant etc.

Step 4 (1380). Transmission of Msg3

For the transmission of Msg3, the eNB may in general select to have the transmissions according to the first UL grant and the second UL grant either on overlapping time-/frequency-resources or not.

If the time-/frequency-resources are overlapping, this may lead to increased processing in the eNB, since there may be twice the number of decoding hypothesis for reception. However, there may be less waste from unused radio resources in this case.

If the time-/frequency-resources are non-overlapping, there may be no increase in eNB processing requirements for reception. However, there may be a waste in radio resources, since one of the UL grants will be unused. However, there may be ways to combat this, e.g., the second UL grant may be at a later point in time, the eNB may reuse/free-up the resources for the second UL grant if it sees that the UE uses the first UL grant, see FIG. 13.

Note that the above choice may not have to be static, but may be done dynamically at every occurrence depending on e.g., resource availability, eNB load etc.

Step 5. (1390) Reception of Msg3

The eNB may search for all of the possible UL grant formats it may expect UE(s) to use. In the dual grant case, this may be understood to mean it may expect to receive either a "legacy" UL grant scheduled Msg3, or a Msg3 scheduled with early data, as indicated using the dual grant, and if more than one possible grant/message sizes are indicated, each of those, as the eNB may not know in advance which capability the UE has.

Scheduling of Resources

At the point in time of sending an RA Response, the eNB may not know whether the UE is of legacy or new type. Therefore, the eNB may overprovision Msg3 scheduling opportunities by being prepared to receive Msg3 from a UE with timing n+k1 for a legacy UE, and also with timing n+k for a new UE, as depicted in FIG. 15. The eNB may therefore schedule both resources.

Embodiment: Overprovisioning of RA Response Grants

The eNB may issue two RA Response messages after receiving a RACH preamble.

Legacy RA Response Grant

The first of these two RA Response messages may be a legacy message that contains a UL grant as defined in TS 36.321 and TS 36.213. This UL grant may have the legacy timing n+k1, as described in the background:

In LTE, the UE shall, according to the UL grant information in the RA response, transmit an UL-SCH transport block in the first subframe $n+k_1$, $k_1 \geq 6$, if the UL delay field is set to zero where $n+k_1$ is the first available UL subframe for PUSCH transmission. The UE shall postpone the PUSCH transmission to the next available UL subframe after $n+k_1$ if the field is set to 1.

A legacy UE may decode this message and proceed to use the UL grant for Msg3.

New RA Response Grant

The second of these two RA Response messages may be a new message that contains a new UL grant. This UL grant may have a new timing of n+k. As one example, this timing may follow the legacy definition, with 6 replaced by $k_{new}$. A new UE may decode this message and may then discard the first RA Response message. A legacy UE may not be able to decode the second message and may therefore use the UL grant of the first RA response message.

Example: Single RA Response Grant

In an alternative mechanism, only one RA Response may be sent from eNB. This RA Response may contain a RA Response grant that may be identical to the legacy one.

A legacy UE may apply the legacy timing n+k1, as described in TS 36.213 and TS 36.321.

A new UE may apply a new timing n+k. In one example $k \geq = k_{new}$ if UL delay bit=0, where n+k may be understood as the first available UL subframe. If the UL delay field bit=1, the UE may postpone the transmission to the next available UL subframe after n+k. Thereby, the timing procedure may follow the legacy definition with 6 replaced by $k_{new}$.

Example Timing

As one example, the new UE may follow a timing of $k_{new}=4$ subframes, thereby reducing the signalling latency with 2 ms.

Indication of RA Response Grant Timing

In an example, the network may indicate the timing procedure for the RA response grant. The indication may be provided in, for instance, the system information (SI), in L1/L2 control signalling, on, e.g., PDDCH, or in a RA Response message. This indication may say that a new UE may apply the shorter timing when reading the RA Response grant. Alternatively, the network may indicate to a new UE that it may transmit the new type of RA Response message, for which the UE may need to apply a new timing.

Sample examples of the first approach may be considered as follows.

A first sample example of the first approach may be a method comprising: a) sending a message to a UE, the message granting the UE two uplinks; and b) receiving data from the UE via one of the two uplinks granted to the UE.

A second sample example of the first approach may be the method of the first sample example, wherein the message is a message 2 and the data is received in a message 3.

A third sample example of the first approach may be the method of the first sample example, further comprising determining whether or not to grant the UE two uplinks.

A fourth sample example of the first approach may be the method of the first sample example, wherein the message granting the UE two uplinks comprises an explicit indication within the message that two uplinks have been granted.

A fifth sample example of the first approach may be the method of the first sample example, further comprising determining whether or not the UE supports the grant of two uplinks.

A sixth sample example of the first approach may be a method comprising: a) receiving from an eNB a message granting the UE two uplinks; b) selecting one of the two uplinks to transmit data to the eNB, and c) transmitting data to the eNB using the selected uplink.

A seventh sample example of the first approach may be the method of the sixth sample example wherein the message is a message 2 and the data is transmitted in a message 3.

An eighth sample example of the first approach may be the method of the sixth sample example wherein the message granting the two uplinks comprises an explicit indication within the message that two up links have been granted.

A ninth sample example of the first approach may be the method of the sixth sample example wherein wireless resources for the two uplinks are overlapping.

Further Extensions And Variations

A method performed by the communications system 280 may comprise one or more of the following actions. The communications system 280 may comprise the host computer 250, and at least one of the network node 210, and the wireless device 230.

Figure 22:
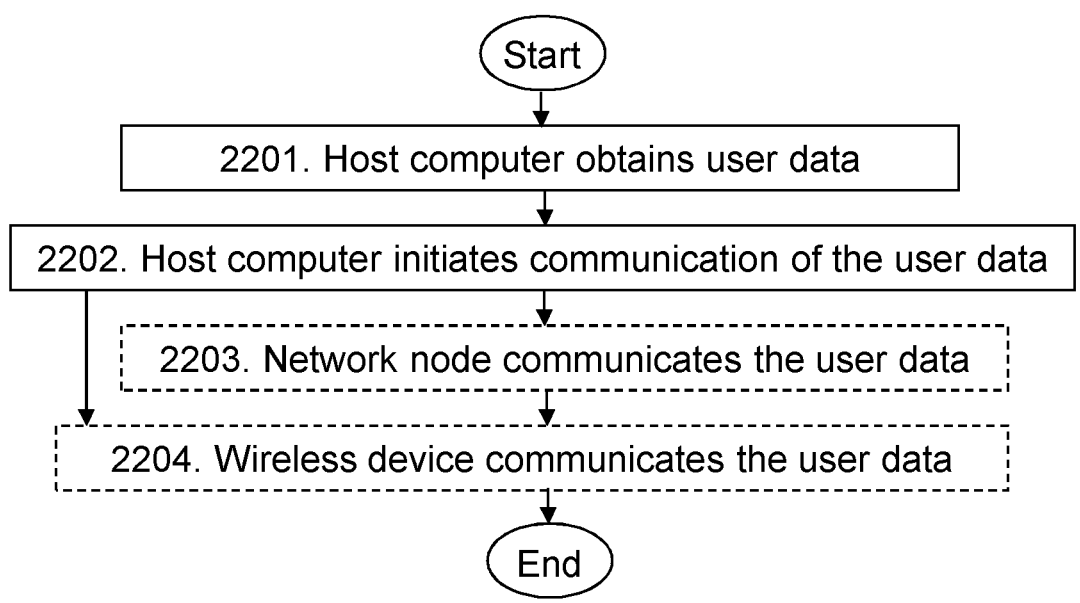
FIG. 22 is a flowchart depicting a method in a telecommunications system, according to embodiments herein.

In some embodiments all the actions may be performed. In some embodiments, one or more actions may be performed. One or more embodiments may be combined, where applicable. All possible combinations are not described to simplify the description. In FIG. 22, optional actions are indicated with dashed lines. Some actions may be performed in a different order than that shown in FIG. 22. For example, since communication may be any of reception of transmission, the actions may be performed in the opposite order than that depicted in FIG. 22.

Action 2201

In this Action 221101, the communications system 280 may obtain, at the host computer 250, the user data for the user of the wireless device 230.

Action 2202

In this Action 2202, the communications system 280 may initiate communication, at the host computer 250, of the user data to or from the wireless device 230.

Action 2203

In this Action 2203, the communications system 280 may communicate, at the network node 210, the user data between the host computer 250 and the wireless device 230. The network node 210 may further perform the Action 501 of sending, to the wireless device 230, the first message granting the wireless device 230 at least two uplink transmissions. The network node 210 may further perform the Action 502 of obtaining, from the wireless device 230, on time-frequency resources indicated in the first granted uplink transmission of the at least two uplink transmissions, the indication indicating whether or not the second granted uplink transmission of the at least two uplink transmissions is to be used by the wireless device 230.

Action 2204

In this Action 2204, the communications system 280 may communicate, at the wireless device 230, the user data to or from the host computer 250. The wireless device 230 may further perform the Action 402 of receiving, from the network node 210, the first message granting the wireless device 230 the at least two uplink transmissions.

The wireless device 230 further perform the Action 402 of indicating 602, to the network node 210, on the time-frequency resources indicated in the first granted uplink transmission of the at least two uplink transmissions, whether or not the second granted uplink transmission of the at least two uplink transmissions is to be used by the wireless device 230.

Communicating may mean herein any of receiving or transmitting. Similarly, communication may be transmission or reception. It may be understood that if the host computer 250 initiates communication, wherein communication is transmission, the communicating 2203 at the network node 210 may comprise receiving from the host computer 250 and transmitting to the wireless device 230, and the communicating 2204 at the wireless device 230 may comprise receiving. Likewise, it may be understood that if the host computer 250 initiates communication, wherein communication is reception, the communicating 2203 at the network node 210 may comprise receiving from the wireless device 230 and transmitting to the host computer 250, and the communicating 2204 at the wireless device 230 may comprise transmitting.

To perform the method actions described above in relation to FIG. 22, the communications system 280 may be configured comprise the network node 210, the wireless device 230 and the host computer 250.

The communications system 280 may be configured to obtain, at the host computer 250, the user data for the user of the wireless device 230. The communications system 280 may be further configured to initiate communication, at the host computer 250, of the user data to or from the wireless device 230.

Figure 23:
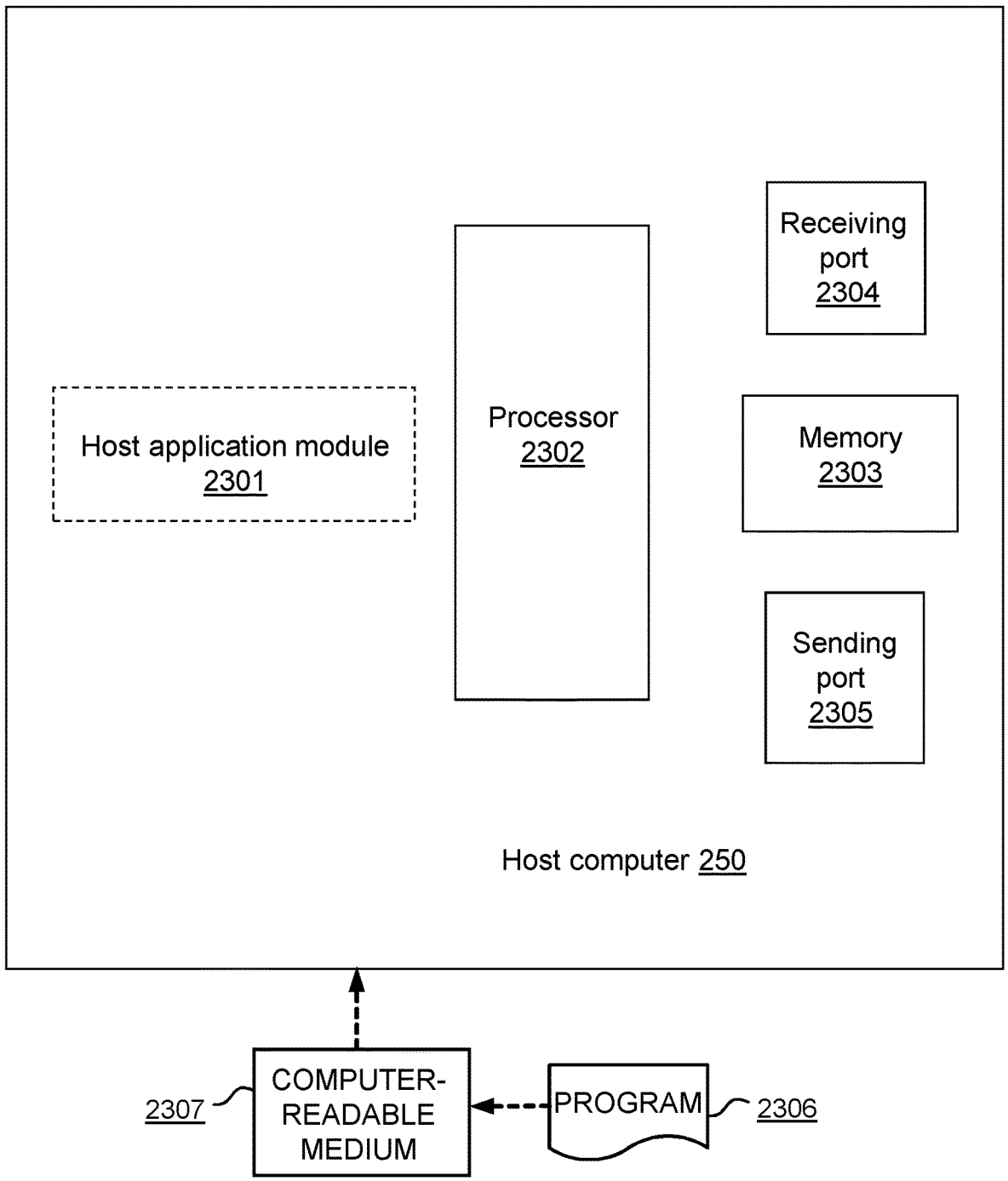
FIG. 23 is a schematic block diagram illustrating embodiments of a host computer, according to embodiments herein.

To perform the method actions described above in relation to FIG. 22, a non-limiting example of the host computer 250 may comprise the following arrangement depicted in FIG. 23.

The detailed description of some of the following corresponds to the same references provided above, in relation to the actions described for the network node 210, and the wireless device 230, and will thus not be repeated here.

The host computer 250 may be configured to, e.g. by means of a host application module 2301 within the host computer 250 configured to, obtain, at the host computer 250, the user data for the user of the wireless device 230. The host application module 2301 may be a processor 2302 of the host computer 250, or an application running on such processor.

The host computer 250 may be configured to, e.g. by means of the host application module 2301 within the host computer 250 configured to, initiate communication, at the host computer 250, of the user data to or from the wireless device 230. The host application module 2301 may be a processor 2302 of the host computer 250, or an application running on such processor.

The embodiments herein may be implemented through one or more processors, such as a processor 2302 in the host computer 250 depicted in FIG. 23, together with computer program code for performing the functions and actions of the embodiments herein. The program code mentioned above may also be provided as a computer program product, for instance in the form of a data carrier carrying computer program code for performing the embodiments herein when being loaded into the in the host computer 250. One such carrier may be in the form of a CD ROM disc. It is however feasible with other data carriers such as a memory stick. The computer program code may furthermore be provided as pure program code on a server and downloaded to the host computer 250.

The host computer 250 may further comprise a memory 2303 comprising one or more memory units. The memory 2303 is arranged to be used to store obtained information, store data, configurations, schedulings, and applications etc. to perform the methods herein when being executed in the host computer 250.

In some embodiments, the host computer 250 may receive information from, e.g., the network node 210, the wireless device 230, or any network node or device, and/or another node in the wireless communication network 200 or another telecommunications network, such as an intermediate network, through a receiving port 2304. In some embodiments, the receiving port 2304 may be, for example, connected to one or more antennas in host computer 250. In other embodiments, the host computer 250 may receive information from another structure in the wireless communication network 200 through the receiving port 2304. Since the receiving port 2304 may be in communication with the processor 2302, the receiving port 2304 may then send the received information to the processor 2302. The receiving port 2304 may also be configured to receive other information.

The processor 2302 in the host computer 250 may be further configured to transmit or send information to e.g., the network node 210, the wireless device 230, and/or another node in the wireless communication network 200 or another telecommunications network, such as an intermediate network, through a sending port 2305, which may be in communication with the processor 2302, and the memory 2303.

Those skilled in the art will also appreciate that the host application module 2301 described above may refer to a combination of analog and digital modules, and/or one or more processors configured with software and/or firmware, e.g., stored in memory, that, when executed by the one or more processors such as the processor 2302, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the host application module 2301 described above may be implemented as one or more applications running on one or more processors such as the processor 2302.

Thus, the methods according to the embodiments described herein for the host computer 250 may be respectively implemented by means of a computer program 2306 product, comprising instructions, i.e., software code portions, which, when executed on at least one processor 2302, cause the at least one processor 2302 to carry out the actions described herein, as performed by the host computer 250. The computer program 2306 product may be stored on a computer-readable storage medium 2307. The computer-readable storage medium 2307, having stored thereon the computer program 2306, may comprise instructions which, when executed on at least one processor 2302, cause the at least one processor 2302 to carry out the actions described herein, as performed by the host computer 250. In some embodiments, the computer-readable storage medium 2307 may be a non-transitory computer-readable storage medium, such as a CD ROM disc, a memory stick, or stored in the cloud space. In other embodiments, the computer program 2306 product may be stored on a carrier containing the computer program, wherein the carrier is one of an electronic signal, optical signal, radio signal, or the computer-readable storage medium 2307, as described above.

The communications system 280 may be further configured to at least one of:

a) communicate, at the network node 210, the user data between the host computer 250 and the wireless device 230, wherein the network node 210 is further configured to:

i) send, to the wireless device 230 configured to operate in the wireless communication network 200, the first message configured to grant the wireless device 230 the at least two uplink transmissions, and ii) obtain, from the wireless device 230, on the time-frequency resources configured to be indicated in the first granted uplink transmission of the at least two uplink transmissions, the indication indicating whether or not the second granted uplink transmission of the at least two uplink transmissions is to be used by the wireless device 230; and b) communicate, at the wireless device 230, the user data to or from the host computer 250, wherein the wireless device 230 is further configured to:

x) receive, from the network node 210 configured to operate in the wireless communication network 200, the first message configured to grant the wireless device 230 the at least two uplink transmissions, and y) indicate, to the network node 210, on the time-frequency resources configured to be indicated in the first granted uplink transmission of the at least two uplink transmissions, whether or not the second granted uplink transmission of the at least two uplink transmissions is to be used by the wireless device 230.

To perform the method actions described above in relation to FIG. 22, network node 210 may be configured to perform this communicating Action 2203, e.g. by means of the other modules 1203 within the network node 210, configured to communicate, at the network node 210, the user data between the host computer 250 and the wireless device 230.

The network node 210 may be configured to perform the other actions as described before. For example, the network node 210 may be further configured to:

iii) obtain the data from the wireless device 230, using the second granted uplink transmission.

Figure 5:
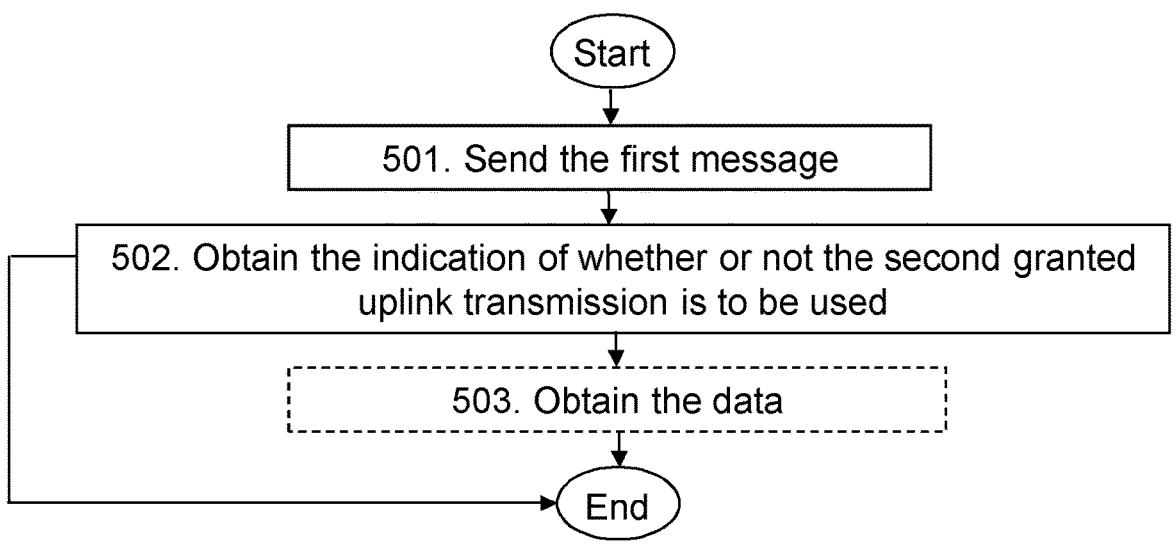
FIG. 5 is a flowchart depicting a method in a network node, according to embodiments herein.

The network node 210 may also be configured to perform any of the other actions described in relation to FIG. 5, as described before.

To perform the method actions described above in relation to FIG. 22, the wireless device 230 may be configured to perform this communicating action 2204, e.g. by means of the client application module 1011 within the wireless device 230, configured to communicate, at the wireless device 230, the user data to or from the host computer 250. The wireless device may be configured to perform the other actions as described before. For example, the wireless device 230 may be further configured to:

z) transmit the data to the network node 210, using the second granted uplink transmission.

Figure 4:
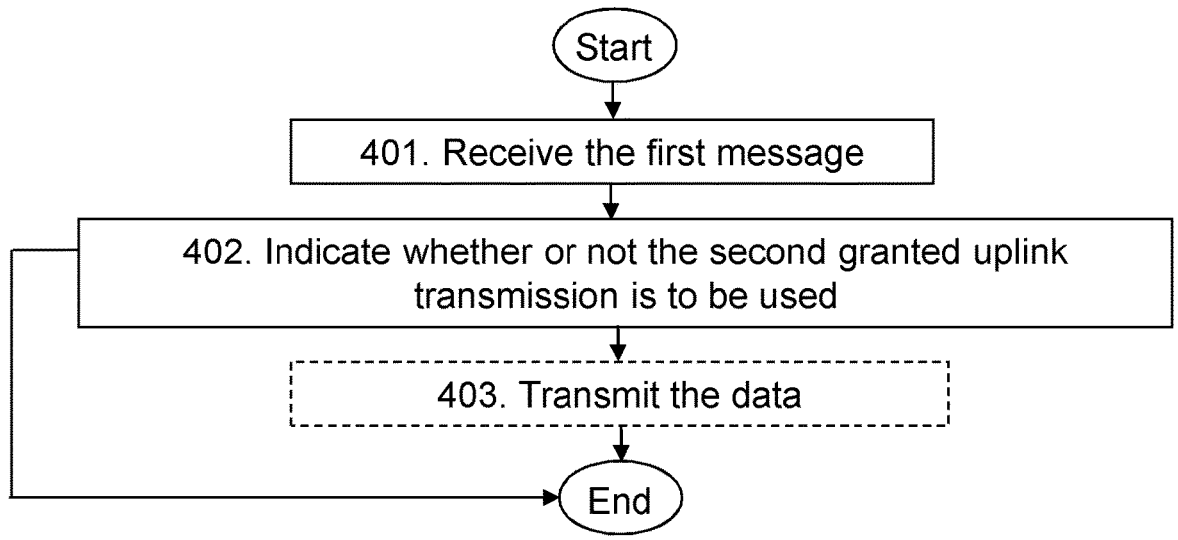
FIG. 4 is a flowchart depicting a method in a wireless device, according to embodiments herein.

The wireless device 230 may also be configured to perform any of the other actions described in relation to FIG. 4, as described before.

When using the word "comprise" or "comprising" it shall be interpreted as non-limiting, i.e. meaning "consist at least of".

The term "module" may be understood as a "unit".

The term processor may be understood to be a hardware component, e.g., a processing circuitry.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, the storage 322 may comprise computer readable means on which a computer program can be stored. The computer program may include instructions which may cause the processor 321, and any operatively coupled entities and devices, such as the interface 323 and the storage 322, to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by the processors 321 and/or 311, possibly in cooperation with the storage 322 and/or 312. The processors 321 and/or 311 and the storage 322 and/or 312 may thus be arranged to allow the processors 321 and/or 311 to fetch instructions from the storage 322 and/or 312 and execute the fetched instructions to allow the respective functional module to perform any steps or functions disclosed herein.

The embodiments herein are not limited to the above described preferred embodiments. Various alternatives, modifications and equivalents may be used. Therefore, the above embodiments should not be taken as limiting the scope of the invention.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

REFERENCES

[1] 3GPP, TS 36.321, "MAC protocol specification", v14.2.0, March 2017
[2] 3GPP, TS 36.331, "RRC protocol specification"; v14.2.0, March 2017
[3] 3GPP, TS 36.300, "E-UTRA and E-UTRAN; Overall description; Stage 2", v14.2.0, March 2017
[4] 3GPP, TS 36.213, "Physical layer procedures", v14.1.0. January 2017.

The invention claimed is:

1. A method, performed by a wireless device, for handling grant use, the wireless device operating in a wireless communication network, the method comprising:
receiving, from a network node operating in the wireless communication network, a first message granting the wireless device at least two uplink transmissions; and
indicating, to the network node, on time-frequency resources indicated in a first granted uplink transmission of the at least two uplink transmissions, whether or not a second granted uplink transmission of the at least two uplink transmissions is to be used by the wireless device.

2. The method according to claim 1, further comprising:
transmitting data to the network node, using the second granted uplink transmission.

3. The method according to claim 2, wherein the first message is a message 2 (Msg2) in a Random Access (RA) procedure, and the data is transmitted in a second message, the second message being a message 3 (Msg3) in the RA procedure.

4. A method, performed by a network node, for handling grant use, the network node operating in a wireless communication network, the method comprising:
sending, to a wireless device operating in the wireless communication network, a first message granting the wireless device at least two uplink transmissions; and
obtaining, from the wireless device, on time-frequency resources indicated in a first granted uplink transmission of the at least two uplink transmissions, an indication indicating whether or not a second granted uplink transmission of the at least two uplink transmissions is to be used by the wireless device.

5. The method according to claim 4, further comprising:
obtaining data from the wireless device, using the second granted uplink transmission.

6. The method according to claim 5, wherein the first message is a message 2 (Msg2) in a Random Access (RA) procedure, and the data is obtained in a second message, the second message being a message 3 (Msg3) in the RA procedure.

7. A wireless device configured to handle grant use, the wireless device being further configured to operate in a wireless communication network, the wireless device comprising:
transceiver circuitry configured for communicating with the wireless communication network; and
processing circuitry operatively associated with the transceiver circuitry and configured to:
receive, from a network node configured to operate in the wireless communication network, a first message configured to grant the wireless device at least two uplink transmissions; and
indicate, to the network node, on time-frequency resources configured to be indicated in a first granted uplink transmission of the at least two uplink transmissions, whether or not a second granted uplink transmission of the at least two uplink transmissions is to be used by the wireless device.

8. The wireless device according to claim 7, wherein the processing circuitry is configured to:
transmit data to the network node, using the second granted uplink transmission.

9. The wireless device according to claim 8, wherein the first message is a message 2 (Msg2) in a Random Access (RA) procedure, and the data is configured to be transmitted in a second message, the second message being a message 3 (Msg3) in the RA procedure.

10. The wireless device according to claim 7, wherein the indication is configured to be provided in one of:
a Medium Access Control (MAC) control element,
reserved R-bits in a power headroom report,
a logical channel identifier in a MAC Protocol Data Unit (PDU) sent in an Uplink Shared Channel (UL-SCH),
one or more bits in a Radio Resource Control (RRC) message configured to be transmitted as part of a Msg3,
an encoding format for Msg3, and
a modulation format for Msg3.

11. The wireless device according to claim 7, wherein the time-frequency resources for the at least two uplink transmissions are overlapping.

12. The wireless device according to claim 7, wherein the first message configured to grant the at least two uplink transmissions comprises an explicit indication within the first message that at least two uplink transmissions have been granted.

13. The wireless device according to claim 7, wherein the at least two uplink transmissions are two uplink transmissions.

14. A network node configured to handle grant use, the network node being further configured to operate in a wireless communication network, the network node comprising:
transceiver circuitry configured for communicating with wireless devices; and
processing circuitry operatively associated with the transceiver circuitry and configured to:
send, to a wireless device configured to operate in the wireless communication network, a first message configured to grant the wireless device at least two uplink transmissions; and
obtain, from the wireless device, on time-frequency resources configured to be indicated in a first granted uplink transmission of the at least two uplink transmissions, an indication indicating whether or not a second granted uplink transmission of the at least two uplink transmissions is to be used by the wireless device.

15. The network node according to claim 14, wherein the processing circuitry is configured to obtain data from the wireless device, using the second granted uplink transmission.

16. The network node according to claim 15, wherein the first message is a message 2 (Msg2) in a Random Access (RA) procedure, and the data is configured to be obtained in a second message, the second message being a message 3 (Msg3) in the RA procedure.

17. The network node according to claim 14, wherein the indication is configured to be obtained in one of:
   a Medium Access Control (MAC) control element,
   reserved R-bits in a power headroom report,
   a logical channel identifier in a MAC Protocol Data Unit (PDU) sent in an Uplink Shared Channel (UL-SCH),
   one or more bits in a Radio Resource Control (RRC) message configured to be transmitted as part of a Msg3,
   an encoding format for Msg3, and
   a modulation format for Msg3.

18. The network node according to claim 14, wherein the time-frequency resources for the at least two uplink transmissions are overlapping.

19. The network node according to claim 14, wherein the first message configured to grant the at least two uplink transmissions comprises an explicit indication within the first message that at least two uplink transmissions have been granted.

20. The network node according to claim 14, wherein the at least two uplink transmissions are two uplink transmissions.

* * * * *